US012724862B2

(12) United States Patent
Zhang et al.

(10) Patent No.: US 12,724,862 B2
(45) Date of Patent: Sep. 1, 2026

(54) VEHICLE COMMUNICATION METHOD, SYSTEM AND DEVICE, AND STORAGE MEDIUM

(71) Applicant: ZTE CORPORATION, Shenzhen (CN)

(72) Inventors: Lu Zhang, Shenzhen (CN); Liping Li, Shenzhen (CN); Yanwei Fang, Shenzhen (CN); Tingxiang Shi, Shenzhen (CN); Rujun Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 12 days.

(21) Appl. No.: 18/728,620

(22) PCT Filed: Nov. 25, 2022

(86) PCT No.: PCT/CN2022/134360
§ 371 (c)(1),
(2) Date: Jul. 12, 2024

(87) PCT Pub. No.: WO2023/134311
PCT Pub. Date: Jul. 20, 2023

(65) Prior Publication Data

US 2025/0111018 A1 Apr. 3, 2025

(30) Foreign Application Priority Data

Jan. 13, 2022 (CN) ........................ 202210036452.X

(51) Int. Cl.
*G06F 21/31* (2013.01)
*H04W 4/48* (2018.01)

(52) U.S. Cl.
CPC ............. *G06F 21/31* (2013.01); *H04W 4/48* (2018.02)

(58) Field of Classification Search
CPC ................................ H04W 4/48; G06F 21/31
See application file for complete search history.

(56) References Cited

U.S. PATENT DOCUMENTS 10,149,192 B2 * 12/2018 Seo ......................... H04L 67/12
11,246,032 B1 * 2/2022 Maass .................. H04L 9/0861
(Continued)

FOREIGN PATENT DOCUMENTS

CN 107650863 A 2/2018
CN 109714344 A 5/2019
(Continued)

OTHER PUBLICATIONS

European Patent Office. Extended European Search Report for EP Application No. 22919944.3, mailed Mar. 21, 2025, pp. 1-8.
(Continued)

*Primary Examiner* — Gary S Gracia
(74) *Attorney, Agent, or Firm* — Vivacqua Crane, PLLC

(57) ABSTRACT

Disclosed are a vehicle communication method, system and device, and a storage medium. The method is applied to a secure communication server end in communication connection with a vehicle-mounted secure communication proxy end, and may include: receiving a target service request; sending an authorization request to a client corresponding to the vehicle-mounted secure communication proxy end according to the target service request; receiving an authorization response generated by the client according to the authorization request; and establishing, according to the authorization response, a data channel for communication connection between the vehicle-mounted secure communication proxy end and the secure communication server end.

20 Claims, 8 Drawing Sheets

(56) References Cited

U.S. PATENT DOCUMENTS

| | | | | |
|---|---|---|---|---|
| 12,160,734 | B2 * | 12/2024 | Van Phan | H04W 12/06 |
| 2011/0009098 | A1 * | 1/2011 | Kong | G08G 1/202 455/457 |
| 2013/0015947 | A1 | 1/2013 | Best | |
| 2014/0220948 | A1 * | 8/2014 | Xia | H04W 4/046 455/415 |
| 2015/0363986 | A1 | 12/2015 | Hoyos et al. | |
| 2016/0099927 | A1 * | 4/2016 | Oz | H04L 63/08 726/9 |
| 2017/0190318 | A1 * | 7/2017 | Imamura | H04W 76/11 |
| 2018/0167790 | A1 * | 6/2018 | Cavalcanti | H04W 4/44 |
| 2019/0054899 | A1 * | 2/2019 | Hoyos | H04L 63/102 |
| 2020/0159943 | A1 | 5/2020 | Rocci et al. | |
| 2020/0259919 | A1 * | 8/2020 | Lepp | H04W 4/44 |
| 2020/0349777 | A1 * | 11/2020 | Bai | G07C 5/006 |
| 2021/0314774 | A1 * | 10/2021 | Van Phan | H04W 76/10 |
| 2023/0155813 | A1 * | 5/2023 | Pan | H04L 9/0825 713/156 |
| 2024/0022992 | A1 * | 1/2024 | Hoshino | H04W 4/44 |
| 2024/0187503 | A1 * | 6/2024 | Go | H04L 69/08 |
| 2025/0111018 | A1 * | 4/2025 | Zhang | G06F 21/31 |

FOREIGN PATENT DOCUMENTS

| | | | |
|---|---|---|---|
| CN | 113542399 | A | 10/2021 |
| CN | 114051223 | A | 2/2022 |
| CN | 114051223 | B | 4/2022 |
| JP | 2007072664 | A | 3/2007 |
| JP | 2017531112 | A | 10/2017 |
| WO | 2019243696 | A1 | 12/2019 |

OTHER PUBLICATIONS

Japan Patent Office. Notice of Reasons for Refusal for JP Application No. 2024-542094 and English translation, mailed Jul. 1, 2025, pp. 1-12.

International Searching Authority. International Search Report and Written Opinion for PCT Application No. PCT/CN2022/134360 and English translation, mailed Feb. 8, 2023, pp. 1-13.

The State Intellectual Property Office of People's Republic of China. First Office Action for CN Application No. 202210036452.X and English translation, mailed Feb. 24, 2022, pp. 1-15.

The State Intellectual Property Office of People's Republic of China. First Search Report for CN Application No. 202210036452.X and English translation, mailed Feb. 17, 2022, pp. 1-5.

The State Intellectual Property Office of People's Republic of China. Supplementary Search Report for CN Application No. 202210036452.X and English translation, mailed Mar. 4, 2022, pp. 1-4.

* cited by examiner

Figures 7, 8, 9:
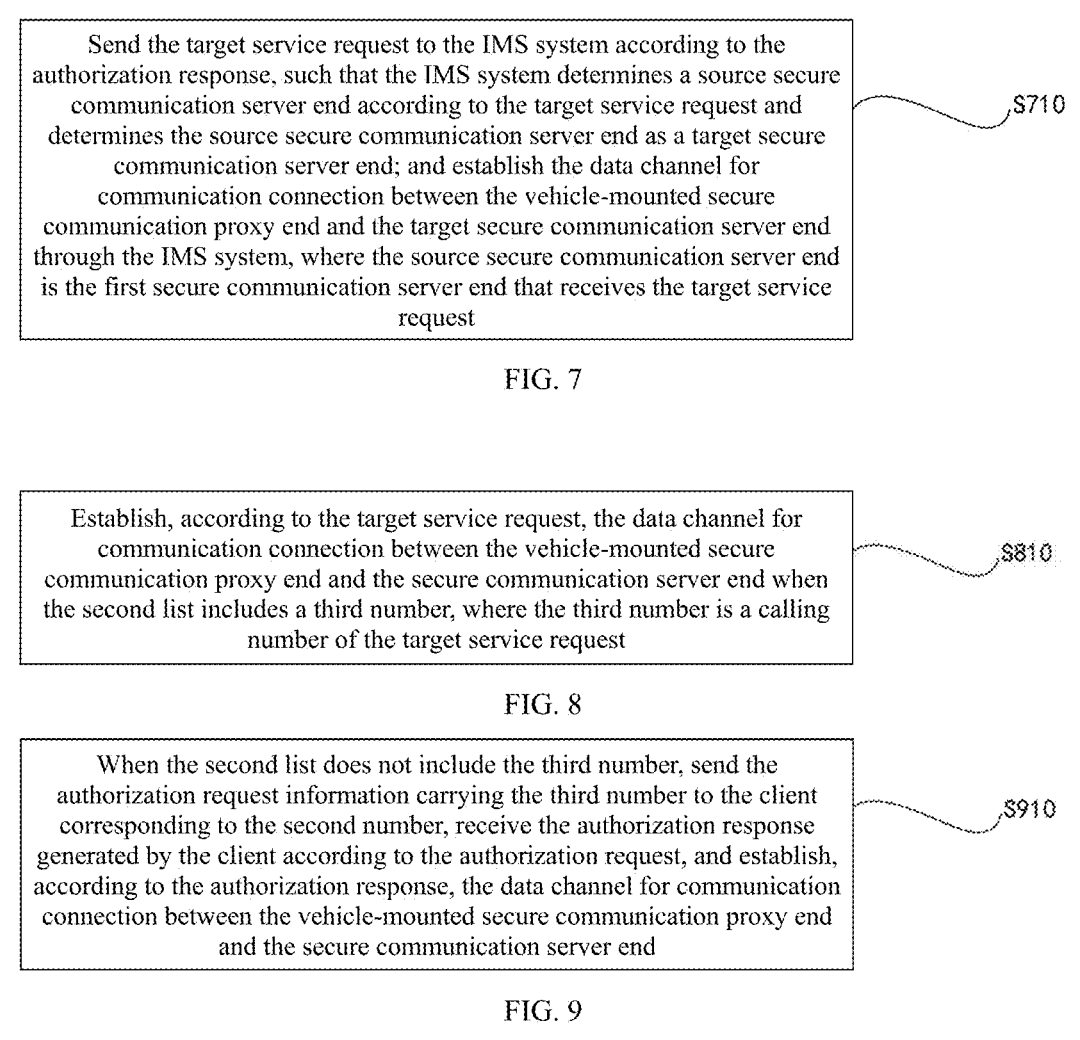

Send the target service request to the IMS system according to the authorization response, such that the IMS system determines a source secure communication server end according to the target service request and determines the source secure communication server end as a target secure communication server end; and establish the data channel for communication connection between the vehicle-mounted secure communication proxy end and the target secure communication server end through the IMS system, where the source secure communication server end is the first secure communication server end that receives the target service request

Establish, according to the target service request, the data channel for communication connection between the vehicle-mounted secure communication proxy end and the secure communication server end when the second list includes a third number, where the third number is a calling number of the target service request

When the second list does not include the third number, send the authorization request information carrying the third number to the client corresponding to the second number, receive the authorization response generated by the client according to the authorization request, and establish, according to the authorization response, the data channel for communication connection between the vehicle-mounted secure communication proxy end and the secure communication server end

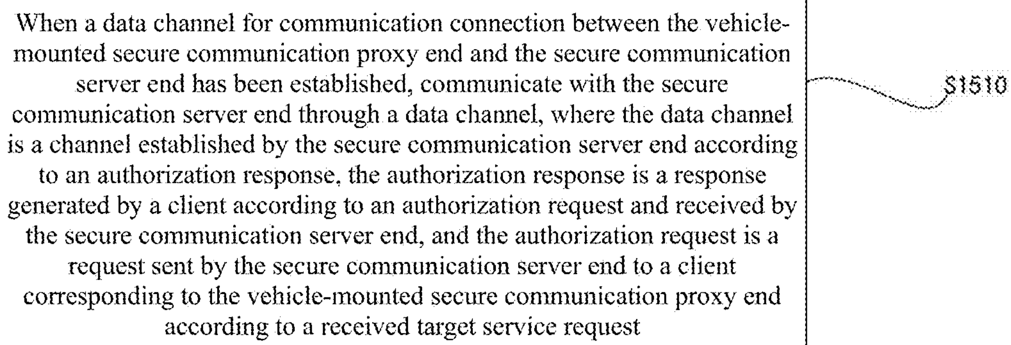
FIG. 15
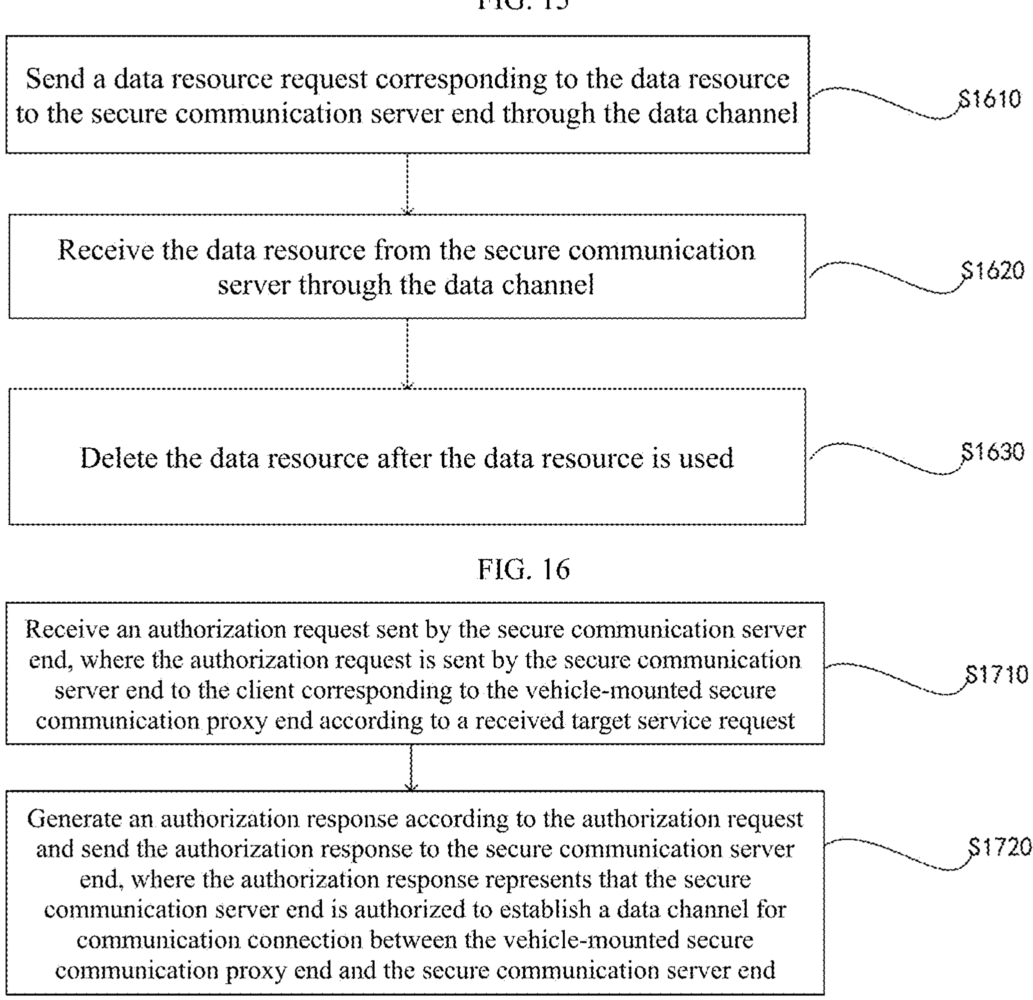
FIG. 16
FIG. 17

VEHICLE COMMUNICATION METHOD, SYSTEM AND DEVICE, AND STORAGE MEDIUM

CROSS-REFERENCE TO RELATED APPLICATION

This application is a national stage filing under 35 U.S.C. § 371 of international application number PCT/CN2022/134360, filed Nov. 25, 2022, which claims priority to Chinese patent application No. 202210036452.X, filed Jan. 13, 2022. The contents of these applications are incorporated herein by reference in their entirety.

TECHNICAL FIELD

The present disclosure relates to the technical field of communication, and in particular to a vehicle communication method, system, and device, and a storage medium.

BACKGROUND

With the development of vehicle intelligence, vehicle operation data, vehicle status data, driving data, etc., can be transmitted to an application (APP) in a mobile phone of a user or to a server of the vehicle manufacturer through a network, to remotely communicate with the vehicle to realize remote control functions such as fault detection, driving data analysis and the like.

In some cases, conventional remote diagnosis and remote control functions are realized through direct communication between the vehicle and a remote vehicle communication server end. However, in this method, the connection between the vehicle and the vehicle manufacturer or the APP in the mobile phone does not require user authorization, and the remote server of the vehicle manufacturer or the APP in the mobile phone can directly communicate with the vehicle remotely and access user data, leading to the security risk of user data leakage or malicious remote control of the vehicle.

SUMMARY

The following is a summary of the subject matter set forth in this description.

Embodiments of the present disclosure provide a vehicle communication method, system, and device, and a storage medium.

In accordance with a first aspect of the present disclosure, an embodiment provides a vehicle communication method, applied to a secure communication server end in communication connection with a vehicle-mounted secure communication proxy end, the method includes: receiving a target service request; sending an authorization request to a client corresponding to the vehicle-mounted secure communication proxy end according to the target service request; receiving an authorization response generated by the client according to the authorization request; and establishing, according to the authorization response, a data channel for communication connection between the vehicle-mounted secure communication proxy end and the secure communication server end.

In accordance with a second aspect of the present disclosure, an embodiment provides a vehicle communication method, applied to a vehicle-mounted secure communication proxy end in communication connection with a secure communication server end, the method includes: in response to a data channel for communication connection between the vehicle-mounted secure communication proxy end and the secure communication server end having been established, communicating with the secure communication server end through the data channel, where the data channel is a channel established by the secure communication server end according to an authorization response, the authorization response is a response generated by a client according to an authorization request and received by the secure communication server end, and the authorization request is a request sent by the secure communication server end to a client corresponding to the vehicle-mounted secure communication proxy end according to a received target service request.

In accordance with a third aspect of the present disclosure, an embodiment provides a vehicle communication method, applied to a client in communication connection with a secure communication server end, where the secure communication server end is in communication connection with a vehicle-mounted secure communication proxy end, the method includes: receiving an authorization request sent by the secure communication server end, where the authorization request is sent by the secure communication server end to the client corresponding to the vehicle-mounted secure communication proxy end according to a received target service request; and generating an authorization response according to the authorization request and sending the authorization response to the secure communication server end, where the authorization response represents that the secure communication server end is authorized to establish a data channel for communication connection between the vehicle-mounted secure communication proxy end and the secure communication server end.

In accordance with a fourth aspect of the present disclosure, an embodiment provides a vehicle communication system, including: a secure communication server end and a vehicle-mounted secure communication proxy end, where the secure communication server end is configured for sending an authorization request to a client corresponding to the vehicle-mounted secure communication proxy end according to a received target service request, receiving an authorization response generated by the client according to the authorization request, and establishing a data channel for communication connection between the vehicle-mounted secure communication proxy end and the secure communication server end according to the authorization response; and the vehicle-mounted secure communication proxy end is configured for sending data to the secure communication server end through the data channel.

In accordance with a fifth aspect of the present disclosure, an embodiment provides a vehicle communication device, including: a memory, a processor, and a computer program stored in the memory and executable by the processor, where the computer program, when executed by the processor, causes the processor to implement the vehicle communication method in accordance with the embodiment of any one of the first aspect, the second aspect, and the second aspect.

In accordance with a sixth aspect of the present disclosure, an embodiment provides a computer-readable storage medium, storing a computer-executable instructions which, when executed by a processor, causes the processor to implement the vehicle communication method in accordance with the embodiment of any one of the first aspect, the second aspect, and the third aspect.

Additional features and advantages of the present disclosure will be set forth in the following description. In addition, the objects and other advantages of the present disclosure can be realized and obtained by the structures particularly pointed out in the description, claims, and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, but are not intended to limit the technical schemes of the present disclosure.

FIG. 7 is a flowchart of steps of a vehicle communication method according to another embodiment of the present disclosure;

FIG. 8 is a flowchart of steps of a vehicle communication method according to another embodiment of the present disclosure;

FIG. 9 is a flowchart of steps of a vehicle communication method according to another embodiment of the present disclosure;

FIG. 15 is a flowchart of steps of a vehicle communication method according to another embodiment of the present disclosure;

FIG. 16 is a flowchart of steps of a vehicle communication method according to another embodiment of the present disclosure;

FIG. 17 is a flowchart of steps of a vehicle communication method according to another embodiment of the present disclosure;

DETAILED DESCRIPTION

Figure 1:
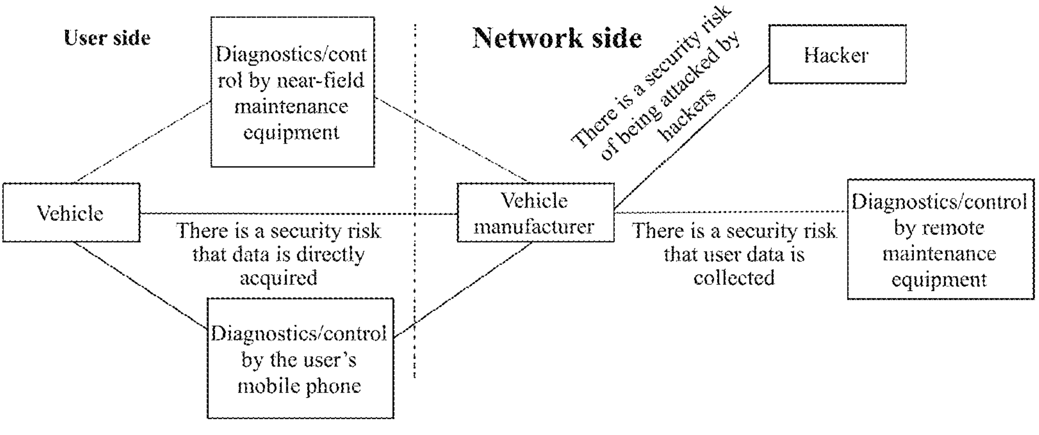
FIG. 1 is a structural diagram of a vehicle communication system in some cases.

To make the objects, technical schemes, and advantages of the present disclosure clear, the present disclosure is described in further detail in conjunction with accompanying drawings and examples. It should be understood that the embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure discloses a vehicle communication method, system, and device, and a storage medium. The vehicle communication method is applied to a secure communication server end in communication connection with a vehicle-mounted secure communication proxy end. The method includes: receiving a target service request; sending an authorization request to a client corresponding to the vehicle-mounted secure communication proxy end according to the target service request; receiving an authorization response generated by the client according to the authorization request; and establishing, according to the authorization response, a data channel for communication connection between the vehicle-mounted secure communication proxy end and the secure communication server end. Through the vehicle communication method proposed in the present disclosure, on the basis of the original vehicle system, a vehicle-mounted secure communication proxy end and a secure communication server end are additionally provided, and a data channel authorized by a user between the vehicle-mounted secure communication proxy end and the secure communication server end is established to realize remote communication. The vehicle-mounted secure communication proxy end is connected to a vehicle device, and the secure communication server end provides an external access interface, to realize the separation of the establishment of a dedicated data channel and the transmission of data content. The transmission of data content needs to be confirmed by a user, and a remote server of a vehicle manufacturer or an APP in a mobile phone can remotely communicate with the vehicle only through an external interface of the secure communication server end. This can prevent an unauthorized remote server of a vehicle manufacturer or an unauthorized APP in a mobile phone from directly communicating with the vehicle remotely, thereby lowering the security risk of user data leakage or malicious remote control of the vehicle.

The embodiments of the present disclosure will be further described in detail below in conjunction with the accompanying drawings.

Referring to FIG. 1, FIG. 1 shows a conventional architecture of vehicle communication.

Vehicle operation data, vehicle status data, driving data, etc., can be transmitted to an APP in a mobile phone of a user or to a server of the vehicle manufacturer through a network, to realize functions such as fault detection, driving analysis, start-up reminder, voltage reminder, fuel consumption analysis, and vibration alarm. In addition, even functions of controlling the vehicle, such as window lifting, turning on/off of vehicle lights, door opening/closing, engine ignition control, etc., can be realized through the APP in the mobile phone or a special device. The status of the vehicle can be checked remotely through a remote control function. A maintenance engineer sends an execution instruction, acquires an execution result, and determines which maintenance items are needed, so as to repair the vehicle remotely. When the vehicle is faulty, the maintenance engineer can remotely diagnose and debug the vehicle, thereby reducing maintenance time. The status of the vehicle is acquired in real time, and the vehicle is correspondingly controlled. For example, when a vehicle owner finds that he or she forgot to turn off a vehicle light or close a window, the vehicle owner can remotely perform operations such as turning off the light and closing the window.

When the vehicle manufacturer diagnoses or controls the vehicle through a near-field maintenance equipment on the user side or diagnoses or controls the vehicle through the user's mobile phone, there is a security risk that the vehicle manufacturer directly acquires the user's vehicle data without the user's authorization. On the network side, there is a security risk that a hacker attacks a remote vehicle server end and acquires the user's vehicle information and a security risk that a remote maintenance equipment collects user data when diagnosing or controlling the vehicle.

It can be understood that for the architecture shown in FIG. 1, the connection between the vehicle and the vehicle manufacturer does not require user authorization, leading to a security risk that one may control the vehicle by controlling the remote server of the vehicle manufacturer. Consequently, the vehicle manufacturer may directly acquire vehicle operation information, including driving routes, etc., without the user's knowledge, resulting in leakage of the user's personal privacy. The server of the vehicle service provider is at risk of being attacked by hackers, and hackers can directly control the vehicle. The remote control APP installed on the user's mobile phone has a security risk of collecting personal mobile phone data.

In view of the above problems, the embodiments of the present disclosure provide a vehicle communication method, system, and device, and a storage medium, to prevent an unauthorized remote server of a vehicle manufacturer or an unauthorized APP in a mobile phone from directly communicating with the vehicle remotely, thereby lowering the security risk of user data leakage or malicious remote control of the vehicle.

Figure 2:
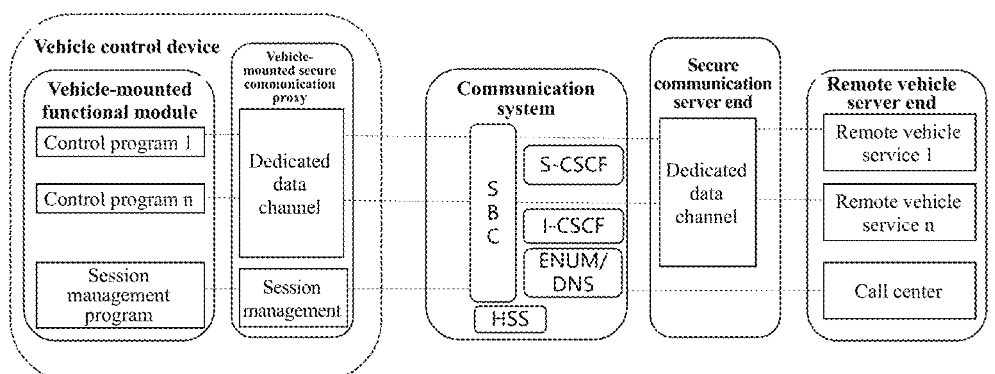
FIG. 2 is a structural diagram of a vehicle communication system according to an embodiment of the present disclosure.

Referring to FIG. 2, FIG. 2 is a diagram of a vehicle communication system according to an embodiment of the present disclosure.

In an embodiment, the vehicle communication system in the present disclosure includes a vehicle-mounted secure communication proxy configured for running in a vehicle control device to provide a session for a vehicle after security authorization. The vehicle-mounted secure communication proxy includes a dedicated data channel, a program management module, a data channel control interface, and a session management module.

The dedicated data channel is configured for communicating with the vehicle control device, and receiving data (e.g., vehicle operation data, etc.) from the vehicle control device and forwarding the data to a secure communication server through the dedicated data channel, or receiving data (e.g., a vehicle control instruction, etc.) from the secure communication server and forwarding the data to the vehicle control device. The program management module is configured for enabling the vehicle-mounted secure communication proxy to acquire a diagnosis or control program from the secure communication server end in response to an operation performed by a user or in response to receiving a control operation request, and destruct the diagnosis or control program after the diagnosis or control program is used. In this way, problems regarding the update of application programs are solved, and the resources occupied by the program are reduced, thereby improving the usability of the vehicle device. The data channel control interface is configured for providing the vehicle control device with capabilities such as establishing, changing and deleting a data channel, such that the vehicle control device can establish, modify and delete the data channel through the data channel control interface. The session management module is configured for interacting with a communication system, and implementing operations such as establishing, modifying, and deleting a dedicated data channel between the vehicle-mounted secure communication proxy end and the secure communication server end that access the communication system through session negotiation. In addition, the system in the present disclosure further includes a communication system. The communication system is realized based on an IP Multimedia System (IMS), and is configured for providing identifiers, e.g., number resources, for the vehicle, the vehicle manufacturer, the user, etc. The entities identify and communicate with each other based on the identifiers. The communication system is further configured for providing registration authentication and verification for the vehicle, the vehicle manufacturer, the user, etc.; providing a routing function for a service request; and providing a media channel for data transmission. In addition, a data channel established by the communication system is a dedicated data channel, which has a data encryption effect and improves the security of system information. The communication system includes, but not limited to, a Session Border Controller (SBC), an Interrogation Call Session Control Function (I-CSCF), a Serving Call Session Control Function (S-CSCF), a Home Subscriber Server (HSS), and an Electronic Numbers to URI Mapping/Domain Name System (ENUM/DNS).

The SBC is responsible for providing an access service to the vehicle-mounted secure communication proxy, and provides negotiation of the dedicated data channel and forwarding of data packets in the present disclosure. The I-CSCF is configured for allocating a service call session control function to the user when the user registers, and is responsible for sending a session to an S-CSCF registered by the user or a specified S-CSCF in a service process. The S-CSCF is configured for providing registration and authentication of a vehicle-mounted secure communication proxy; Session Initialization Protocol (SIP) session management for the dedicated data channel, including session establishment, session refresh, session release, session maintenance, emergency call, message management, etc.; and routing management of the dedicated data channel. When receiving a service request sent by or sent to the vehicle-mounted secure communication proxy, the S-CSCF is responsible for finding a suitable route in the network and forwarding the service request. The HSS is configured for storing user authentication information of the vehicle-mounted secure communication proxy, specific information of a subscriber, dynamic information of the subscriber, etc., and cooperating with the CSCFs to implement the registration and authentication of the vehicle-mounted secure communication proxy. The ENUM/DNS is configured for implementing conversion between the user's E.164 number and a SIP URI, and providing mapping of an IP address corresponding to the user's home domain name, to assist IMS core-network network elements in implementing session routing.

In an embodiment, the system in the present disclosure further includes a secure communication server end, which interacts with the vehicle-mounted secure communication proxy end to realize trusted and secure communication of, e.g., vehicle data and control instructions.

Functions of the secure communication server end include providing an authorization operation for a service request. Any communication with a vehicle-mounted device on the vehicle requires authorization by a particular device owned by the user. For example, when the vehicle-mounted device on the vehicle actively initiates a request to the outside, the communication system requests authorization from a device owned by the user (e.g., a mobile phone) according to a policy preset by the user. The request can continue only after the authorization is granted. The authorization may be granted through a voice call or a text message. For another example, when the vehicle manufacturer needs to operate the vehicle, the user's number may be called through the communication system, and after obtaining the user's authorization, the communication system forwards the call to the vehicle communication device. In addition, the secure communication server end can also realize secure transmission of vehicle data. The secure communication server end and the vehicle-mounted secure communication proxy transmit data content through a dedicated data channel, which uses encrypted communication to realize the secure transmission of the vehicle data.

It can be understood that the secure communication server end further includes a dedicated data channel, a program management module, and a data channel control interface that correspond to the vehicle-mounted secure communication proxy.

It can be understood that in the case of secure transmission of the vehicle data, corresponding data interaction is provided for a third party to implement a corresponding service. For example, the secure communication server end forwards received data content to a remote vehicle server end or a terminal device, so as to finally implement the interaction between the remote vehicle server end or terminal device and the vehicle. Similarly, the remote vehicle server end or terminal device may also send various data to the vehicle through the secure communication server, so as to implement the data interaction while ensuring data security through user authorization.

In an embodiment, the system in the present disclosure further includes a vehicle-mounted function module, which is configured for communicating with a vehicle head unit through a data bus to implement transmission of instructions and information from the vehicle head unit. The instructions and information from the vehicle head unit include vehicle status information, button status information, control instructions, etc. The vehicle-mounted function module may run on a vehicle-mounted Telematics box (T-BOX). In the present disclosure, the vehicle control device needs to realize communication with the remote vehicle server end through the vehicle-mounted secure communication proxy, to realize various functional control modules, including but not limited to: providing a vehicle condition report, a driving report, fuel consumption statistics, fault reminders, violation inquiries, location trajectories, driving behavior, safety and anti-theft, service reservation, remote car search, use of a mobile phone to control vehicle doors, windows, lights, locks, horns, double flashes, rearview mirror folding, and sunroof, monitoring console warnings and airbag status, etc.

It can be understood that in an embodiment, the vehicle-mounted function module and the vehicle-mounted secure communication proxy are arranged in a vehicle control device together. The vehicle control device is, for example, a T-BOX, an ECU, etc. The vehicle-mounted function module further includes data interfaces such as sensor interfaces and human-machine communication interfaces, and commonly used vehicle-mounted hardware devices such as USIM card slots and data storage devices. The vehicle control device implements remote control of the vehicle through remote communication using the vehicle-mounted secure communication proxy.

In an embodiment, the system in the present disclosure further includes a remote vehicle server end. The remote vehicle server end includes a vehicle manufacturer or a vehicle dealer. The remote vehicle server end includes a functional module and a call center. The functional module is configured for providing the user with remote diagnosis, remote maintenance, business consultation, and other remote vehicle services based on remote vehicle communication, and cooperating with a functional control module to download a corresponding control program for the user, to realize a corresponding function. The remote vehicle server end establishes communication with the vehicle through the secure communication server end and the vehicle-mounted secure communication proxy, to realize the secure and authorized transmission of vehicle data or vehicle control instructions. The call center is configured for implementing remote communication with a session management program of the vehicle-mounted secure communication proxy through a data channel, to provide guidance services for users.

It can be understood that the present disclosure can be applied to remote diagnosis, remote maintenance, remote driving control, etc., of the vehicle, as well as simulated driving, Augmented Reality/Virtual Reality (AR/VR) virtual driving and other scenarios, to realize remote diagnosis, remote maintenance, etc., of the vehicle, thereby greatly reducing the time required for vehicle maintenance.

Figure 3:
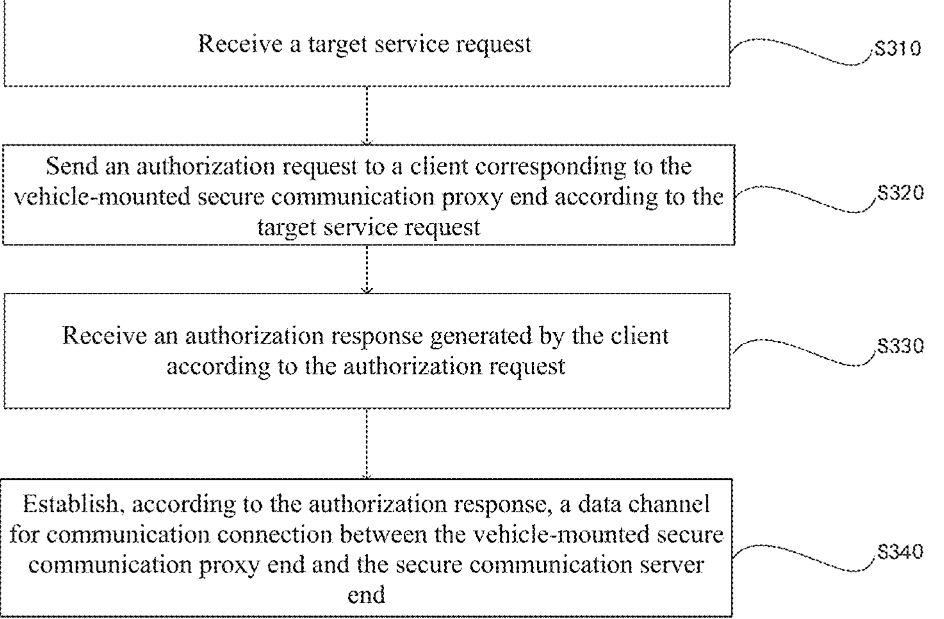
FIG. 3 is a flowchart of steps of a vehicle communication method according to another embodiment of the present disclosure.

FIG. 3 is a flowchart of steps of a vehicle communication method according to an embodiment of the present disclosure. Referring to FIG. 3, the method includes, but not limited to, the following steps S310 to S340.

At S310, a target service request is received.

It can be understood that the target service request includes all remote communications in which a vehicle-mounted secure communication proxy participates, corresponding to service requests, e.g., a service request sent by the vehicle-mounted secure communication proxy to the outside, a service request sent by a client corresponding to an external number to the vehicle-mounted secure communication proxy, or a service request sent by a vehicle manufacturer or an APP in a mobile phone to the vehicle-mounted secure communication proxy.

It can be understood that a secure communication server and the vehicle-mounted secure communication proxy are connected to an IMS system of a telecommunications operator for interaction. In addition, the secure communication server and the vehicle-mounted secure communication proxy may also interact with other communication devices of the vehicle owner. The secure communication server can receive a target service request through a communication network, and perform subsequent operations according to the target service request.

At S320, an authorization request is sent to a client corresponding to the vehicle-mounted secure communication proxy end according to the target service request.

It can be understood that after receiving the target service request, the secure communication server sends an authorization request to a client corresponding to the vehicle-mounted secure communication proxy according to the target service request. The client represents an operation side where the user performs an authorization operation. Authorization modes include manual calling, information sending, software-based determination, and other commonly used message determination methods.

When the user uses the vehicle-mounted secure communication proxy to initiate a session request to the outside, the secure communication server end changes identity information in the session request to a number designated by the vehicle owner, so as to realize the hiding of a number of the vehicle-mounted secure communication proxy. When an external user initiates a session request to the vehicle owner's mobile phone, the vehicle owner may operate the mobile phone to notify the secure communication server end to forward the session request to the vehicle-mounted secure communication proxy, such that authorization of all sessions that attempt to connect to the vehicle is determined by the vehicle owner.

At S330, an authorization response generated by the client according to the authorization request is received.

It can be understood that when the secure communication server receives the authorization response generated by the client according to the authorization request, it indicates that the user allows the sender of the corresponding target service request to perform corresponding remote communication with the vehicle-mounted secure communication proxy to implement a corresponding remote control service.

At S340, a data channel for communication connection between the vehicle-mounted secure communication proxy end and the secure communication server end is established according to the authorization response.

The vehicle-mounted secure communication proxy in this system is responsible for communicating with a vehicle control device, and acquiring vehicle operation data from the vehicle control device and forwarding the vehicle operation data to the secure communication server end through a dedicated data channel, or receiving a vehicle control instruction from the secure communication server end and forwarding the vehicle control instruction to the vehicle control device.

In this system, the secure communication server end interacts with the vehicle-mounted secure communication proxy and a remote vehicle server end, respectively. The secure communication server end and the vehicle-mounted secure communication proxy transmit data content through a dedicated data channel. The secure communication server end may forward the data content to the remote vehicle server end to implement the interaction between the remote vehicle server end and the vehicle. The remote vehicle server end includes remote communication users such as a mobile terminal and a vehicle service provider.

It can be understood that data channel establishment is separated from data access by the method of the present disclosure, a remote communication end is required to access the secure communication server end to send a request, the secure communication server end establishes a data channel with the vehicle-mounted secure communication proxy end after being authorized by the user, and then the remote communication end indirectly performs remote communication through the secure communication server end, thereby ensuring that all operations performed on the vehicle are supervised by the user.

In an embodiment, after the vehicle-mounted secure communication proxy establishes a dedicated data channel with the secure communication server end, the control device in the vehicle may interact with the remote vehicle server end through the dedicated data channel, and the secure communication server end transparently forwards the data content.

It can be understood that the vehicle authentication and authorization mechanism is improved by additionally arranging the secure communication server and the vehicle-mounted secure communication proxy. The secure communication server transparently forwards data transmitted by the vehicle-mounted secure communication proxy. With the use of a dedicated information channel, the secure communication server does not need to encrypt and decrypt data from the vehicle-mounted secure communication proxy, thereby saving server resources, greatly simplifying registration and authentication in the remote vehicle communication system, and lowering the difficulty of authentication for the vehicle manufacturer.

It can be understood that because the remote vehicle server end cannot directly access vehicle data corresponding to the vehicle-mounted secure communication proxy, personal privacy is well protected, and the vehicle service provider is prevented from directly acquiring vehicle operation information such as driving routes without the user's knowledge, which results in the leakage of the user's personal privacy.

In an embodiment, the data channel established according to the authorization response for communication connection between the vehicle-mounted secure communication proxy end and the secure communication server end and all communications in the present disclosure are implemented based on an IMS dedicated data channel, which provides an encrypted secure communication mode supporting parallel processing of multiple data streams, to ensure that communication content between vehicle-mounted communication devices and other entities (e.g., the vehicle manufacturer, etc.) will not be stolen.

In an embodiment, the secure communication server and the vehicle-mounted secure communication proxy may use numbers from different telecommunications operators. In this way, interworking of different telecommunications operators can be achieved.

It can be understood that the vehicle manufacturer, a software service provider, a developer, etc., may deploy vehicle diagnosis or control programs on the secure communication server end for the vehicle-mounted secure communication proxy to download on demand. The vehicle-mounted secure communication proxy may acquire a diagnosis or control program from the secure communication server end in response to an operation performed by the user or when receiving a control operation request. The secure communication server end provides an interface for the vehicle manufacturer, the software service provider, the developers, etc., to manage programs, such as uploading, modifying, and deleting a program.

In an embodiment, when the client corresponds to a plurality of vehicle-mounted secure communication proxy ends, the secure communication server end, after receiving the target service request, sends an authorization request to the corresponding client according to the target service request; receives an authorization response generated by the client according to the authorization request, where the authorization response carries a target vehicle-mounted secure communication proxy end determined by the client from the plurality of vehicle-mounted secure communication proxy ends; and establishes, according to the target vehicle-mounted secure communication proxy end, a data channel for communication connection between the target vehicle-mounted secure communication proxy end and the secure communication server end.

It can be understood that in practical applications, a client of a user may correspond to a plurality of vehicle-mounted secure communication proxy ends, and an external number may directly initiate a service request to the client of the user based on a Calling Line Identification Presentation (CLIP) number of the user. In this case, when receiving such a service request, the secure communication server end sends the service request to the client of the user, waits for the user to authorize and designate one of the vehicle-mounted secure communication proxy ends to receive the service request, i.e., designate one of the vehicle-mounted secure communication proxy ends to establish a connection with the sender of the service request through the secure communication server end. In this way, the user can authorize one of the plurality of vehicle-mounted secure communication proxy ends corresponding to the user to the initiator of the service request according to content of the service request and an actual situation, to achieve flexible authorization. As such, the user owing a plurality of vehicles can well supervise the remote communication control of the vehicles.

In addition, the flexible user authorization achieved by allowing an external number to directly initiate a service request to the user based on a CLIP number of the user can also solve the problem that the vehicle cannot be remotely controlled because an external communication end only knows the number of the client of the user and does not know the number of the vehicle-mounted secure communication proxy end or the dialed number of the vehicle-mounted secure communication proxy end is busy, thereby well supervising the remote communication control of the vehicles.

Figures 4, 5, 6:
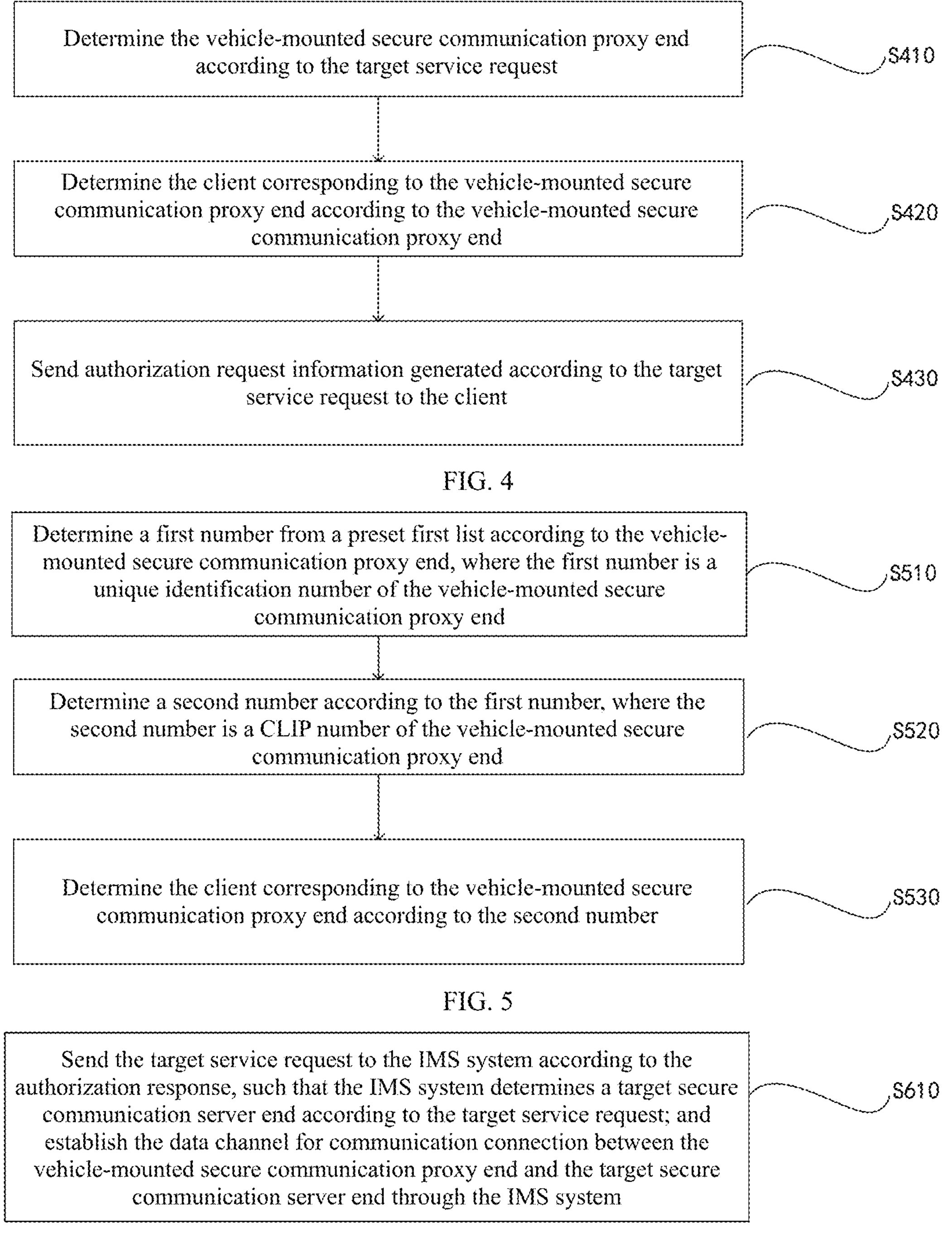
FIG. 4 is a flowchart of steps of a vehicle communication method according to another embodiment of the present disclosure.
FIG. 5 is a flowchart of steps of a vehicle communication method according to another embodiment of the present disclosure.
FIG. 6 is a flowchart of steps of a vehicle communication method according to another embodiment of the present disclosure.

FIG. 4 is a flowchart of steps of a vehicle communication method according to another embodiment of the present disclosure. Referring to FIG. 4, the method includes, but not limited to, the following steps S410 to S430.

At S410, the vehicle-mounted secure communication proxy end is determined according to the target service request.

At S420, the client corresponding to the vehicle-mounted secure communication proxy end is determined according to the vehicle-mounted secure communication proxy end.

At S430, authorization request information generated according to the target service request is sent to the client.

It can be understood that the data channel establishment process requires the vehicle owner to participate in the confirmation to realize the authorization operation for the establishment of a dedicated data channel. Identification information corresponding to the vehicle-mounted secure communication proxy end in the target service request is matched against a database in the secure communication server end to determine a client corresponding to the vehicle-mounted secure communication proxy end, and the authorization request information generated according to the target service request is sent to the client through the communication network.

It should be noted that the client means the side corresponding to the vehicle owner, and may be any communication device or mobile terminal that can receive and send messages. The secure communication server end communicates the target service request to the vehicle owner and performs follow-up steps after the target service request is authorized by the vehicle owner.

Referring to FIG. 5, FIG. 5 is a flowchart of steps of a vehicle communication method according to another embodiment of the present disclosure. The method includes, but not limited to, the following steps S510 to S530.

At S510, a first number is determined from a preset first list according to the vehicle-mounted secure communication proxy end, where the first number is a unique identification number of the vehicle-mounted secure communication proxy end.

At S520, a second number is determined according to the first number, where the second number is a CLIP number of the vehicle-mounted secure communication proxy end.

At S530, the client corresponding to the vehicle-mounted secure communication proxy end is determined according to the second number.

The first number is a number corresponding to the vehicle-mounted secure communication proxy end. The second number is the CLIP number of the vehicle-mounted secure communication proxy end. The first list is a registration information table of numbers corresponding to vehicle-mounted secure communication proxy ends. The first list represents an association relationship between user numbers, vehicle controllers, and remote vehicle server ends. One user number is allowed to be associated with a plurality of vehicles of different vehicle brands and a plurality of vehicles of the same vehicle brand. A session request can be accurately sent to the corresponding vehicle-mounted secure communication proxy end. In this way, more services can be provided for the user, and different vehicle service providers can provide services for the same vehicle. The user no longer only receives services from one vehicle service provider and therefore can enjoy better vehicle services.

In an embodiment, a process of setting the first number, the second number, and the first list includes that:

- the user applies for an individual number for the vehicle-mounted secure communication proxy end at a telecommunications operator; and
- the user uses the number at the vehicle-mounted secure communication proxy to initiate a session request to a number designated by the secure communication server end, the vehicle-mounted secure communication proxy downloads a setting small program from the secure communication server end, and the user manages a correspondence between an identifier (globally unique) of the vehicle-mounted secure communication proxy, authorized numbers, vehicle brands, and the CLIP number through the setting small program, where the correspondence is stored in the secure communication server end as the first list; or the user sets a correspondence between an identifier (globally unique) of vehicle-mounted secure communication proxy, (one or more) authorized numbers, vehicle brand identifiers, and the CLIP number through a telecommunication business office system of an operator, where the correspondence is stored in the secure communication server end as the first list.

It can be understood that after the authorization setting for the number of the vehicle-mounted secure communication proxy is completed, only the authorized numbers in the authorization list can directly access the vehicle-mounted secure communication proxy, and other numbers cannot access the vehicle-mounted secure communication proxy without being authorized by the CLIP number. Numbers of special departments, such as 110, 119, etc., may be set by the operator through the secure communication server end, and the user is not allowed to change such numbers.

FIG. 6 is a flowchart of steps of a vehicle communication method according to another embodiment of the present disclosure. Referring to FIG. 6, the method includes, but not limited to, a following step S610.

At S610, the target service request is sent to the IMS system according to the authorization response, such that the IMS system determines a target secure communication server end according to the target service request; and the data channel for communication connection between the vehicle-mounted secure communication proxy end and the target secure communication server end is established through the IMS system.

The secure communication server end is in communication connection with the vehicle-mounted secure communication proxy end through the IMS system. The target service request is a service request sent by the vehicle-mounted secure communication proxy end, corresponding to a scenario where the vehicle-mounted device on the vehicle actively initiates a request to the outside. For example, the communication system requests authorization from a device owned by the user according to a policy preset by the user. The request can continue only after the authorization is granted. The authorization may be granted through a voice call or a text message.

FIG. 7 is a flowchart of steps of a vehicle communication method according to another embodiment of the present disclosure. Referring to FIG. 7, the method includes, but not limited to, a following step S710.

At S710, the target service request is sent to the IMS system according to the authorization response, such that the IMS system determines a source secure communication server end according to the target service request and determines the source secure communication server end as a target secure communication server end; and the data channel for communication connection between the vehicle-mounted secure communication proxy end and the target secure communication server end is established through the IMS system, where the source secure communication server end is the first secure communication server end that receives the target service request.

A destination node of the target service request is the vehicle-mounted secure communication proxy end, corresponding to a scenario where an external entity performs remote access to the vehicle. For example, when the vehicle manufacturer needs to operate the vehicle, the user's number may be called through the communication system, and after obtaining the user's authorization, the communication system forwards the call to the vehicle communication device.

In addition, the communication system allows exception processing for particular service numbers, e.g., emergency call numbers such as 110 and 112, such that entities corresponding to such numbers can directly communicate with the vehicle-mounted device without user authorization.

It can be understood that in another scenario where the destination node of the target service request is the vehicle-mounted secure communication proxy end, the vehicle owner uses a mobile phone to call the vehicle-mounted secure communication proxy, the call is sent to the secure communication server end through the IMS system, and after verifying the call, the secure communication server end routes the call to the vehicle-mounted secure communication proxy through the IMS system, thus realizing the interaction between the mobile phone and the vehicle-mounted secure communication proxy.

FIG. 8 is a flowchart of steps of a vehicle communication method according to another embodiment of the present disclosure. t to FIG. 8, the method includes, but not limited to, a following step S810.

At S810, the data channel for communication connection between the vehicle-mounted secure communication proxy end and the secure communication server end is established according to the target service request when the second list includes a third number, where the third number is a calling number of the target service request.

A second list is set in the secure communication server end. The second list includes authorized number information. After receiving the target service request, the secure communication server end determines according to the calling number of the target service request whether the sender of the target service request has been authorized by the vehicle owner. If the second list includes the third number, the authorization process for this session access is completed, and a channel between the sender and the vehicle-mounted secure communication proxy is established.

It can be understood that the secure communication server end may store a number whitelist of the vehicle owner, i.e., the second list, and only numbers in the number whitelist are allowed to initiate a session request to the vehicle-mounted secure communication proxy, thereby ensuring that the vehicle will not be accessed by unauthorized users.

FIG. 9 is a flowchart of steps of a vehicle communication method according to another embodiment of the present disclosure. Referring to FIG. 9, the method includes, but not limited to, a following step S910.

At S910, when the second list does not include the third number, the authorization request information carrying the third number is sent to the client corresponding to the second number, the authorization response generated by the client according to the authorization request is received, and the data channel for communication connection between the vehicle-mounted secure communication proxy end and the secure communication server end is established according to the authorization response.

When the second list does not include the third number, the secure communication server end, after receiving the target service request, sends an authorization request to the client corresponding to the vehicle-mounted secure communication proxy according to the target service request, authorizes the third number by receiving the authorization response generated by the client according to the authorization request, and establishes a channel between the sender corresponding to the third number and the vehicle-mounted secure communication proxy.

It can be understood that the secure communication server end may store a number whitelist of the vehicle owner, i.e., the second list, and when the calling number is not a number in the number whitelist, the secure communication server end initiates a communication with the vehicle owner for authentication, thereby ensuring that the vehicle will not be accessed by unauthorized users.

It can be understood that S810 and S910 represent a scenario where an external number (which may be an authorized number or not) directly initiates a service request to the number of the vehicle-mounted secure communication proxy, in which case the secure communication server end needs to perform an authorization operation on the session request.

Figures 10, 11, 12:
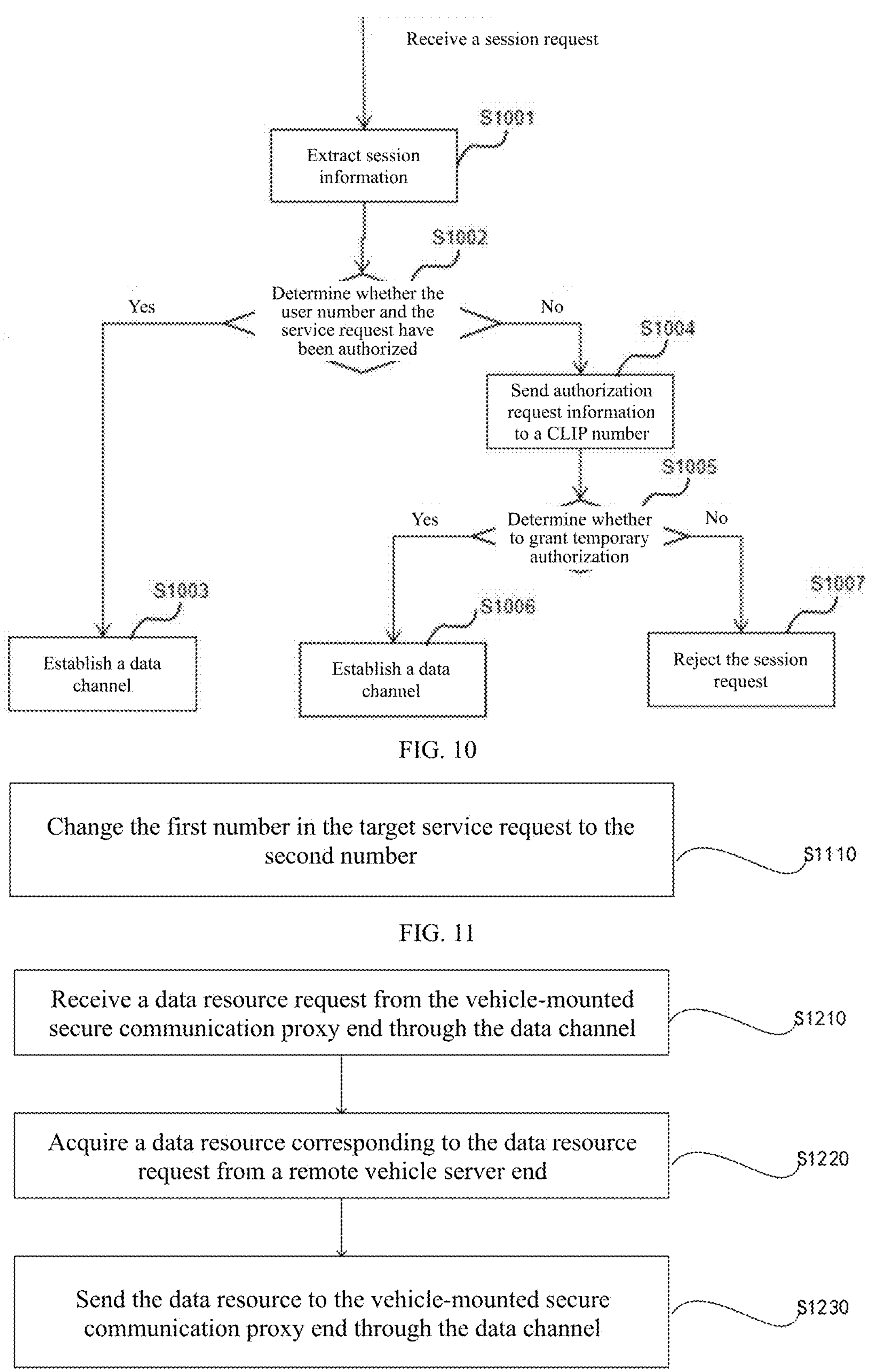
FIG. 10 is an example diagram of a vehicle communication method according to another embodiment of the present disclosure.
FIG. 11 is a flowchart of steps of a vehicle communication method according to another embodiment of the present disclosure.
FIG. 12 is a flowchart of steps of a vehicle communication method according to another embodiment of the present disclosure.

FIG. 10 is a flowchart of service interaction in a scenario where an external number directly initiates a session request to the number of the vehicle-mounted secure communication proxy according to another embodiment of the present disclosure. Referring to FIG. 10, the flowchart includes, but not limited to, the following steps S1001 to S1007.

At S1001, a secure communication server end receives a session request for requesting to establish a dedicated data channel with a vehicle-mounted secure communication proxy, and extracts information such as a calling number and a service request type from the session request.

At S1002, the secure communication server end matches the information against an authorization database of the vehicle-mounted secure communication proxy end to determine whether the calling number and the service request type are allowed.

At S1003, if the calling number and the service request type are allowed, the secure communication server end continues to execute the process of establishing a dedicated data channel, and sends notification information to a user of a CLIP number through voice or message, to prompt that a service request is attempting to access the vehicle-mounted secure communication proxy.

At S1004, if the calling number and the service request type are not allowed, the secure communication server end sends an authorization request to the CLIP number.

At S1005, the secure communication server end checks an authorization result from the user.

At S1006, if the user of the CLIP number temporarily authorizes the current service request, the secure communication server end continues to execute the process of establishing a dedicated data channel, and sends an event notification to the CLIP number.

At S1007, if the user of the CLIP number rejects the current service request, the secure communication server end rejects the request for establishing a dedicated data channel, and the session ends.

FIG. 11 is a flowchart of steps of a vehicle communication method according to another embodiment of the present disclosure. Referring to FIG. 11, the method includes, but not limited to, a following step S1110.

At S1110, the first number in the target service request is changed to the second number.

It can be understood that the first number is the number corresponding to the vehicle-mounted secure communication proxy, the second number is the CLIP number set by the vehicle owner, and when the user uses the vehicle-mounted secure communication proxy to initiate a session request to the outside, the secure communication server end changes identity information in the session request to a number designated by the vehicle owner, so as to realize the hiding of a number of the vehicle-mounted secure communication proxy.

FIG. 12 is a flowchart of steps of a vehicle communication method according to another embodiment of the present disclosure. Referring to FIG. 12, the method includes, but not limited to, the following steps S1210 to S1230.

At S1210, a data resource request from the vehicle-mounted secure communication proxy end is received through the data channel.

At S1220, a data resource corresponding to the data resource request is acquired from a remote vehicle server end.

At S1230, the data resource is sent to the vehicle-mounted secure communication proxy end through the data channel.

It can be understood that the secure communication server end is in communication connection with the vehicle-mounted secure communication proxy end through the IMS system, and the target service request is a service request sent by the vehicle-mounted secure communication proxy end, corresponding to a scenario where the vehicle-mounted device on the vehicle actively initiates a request to the outside. After the data resource request from the vehicle-mounted secure communication proxy end is received through the data channel, the data resource corresponding to the data resource request is acquired from the remote vehicle server end, and the data resource is sent to the vehicle-mounted secure communication proxy end through the data channel. In this way, the vehicle can acquire an external resource through remote communication, e.g., download a diagnosis program for remote diagnosis, download a new system version for system upgrading, and so on.

It can be understood that the vehicle manufacturer, a software service provider, a developer, etc., may deploy vehicle diagnosis or control programs on the secure communication server end for the vehicle-mounted secure communication proxy to download on demand. The vehicle-mounted secure communication proxy may acquire a diagnosis or control program from the secure communication server end in response to an operation performed by the user or when receiving a control operation request.

Figures 13, 14:
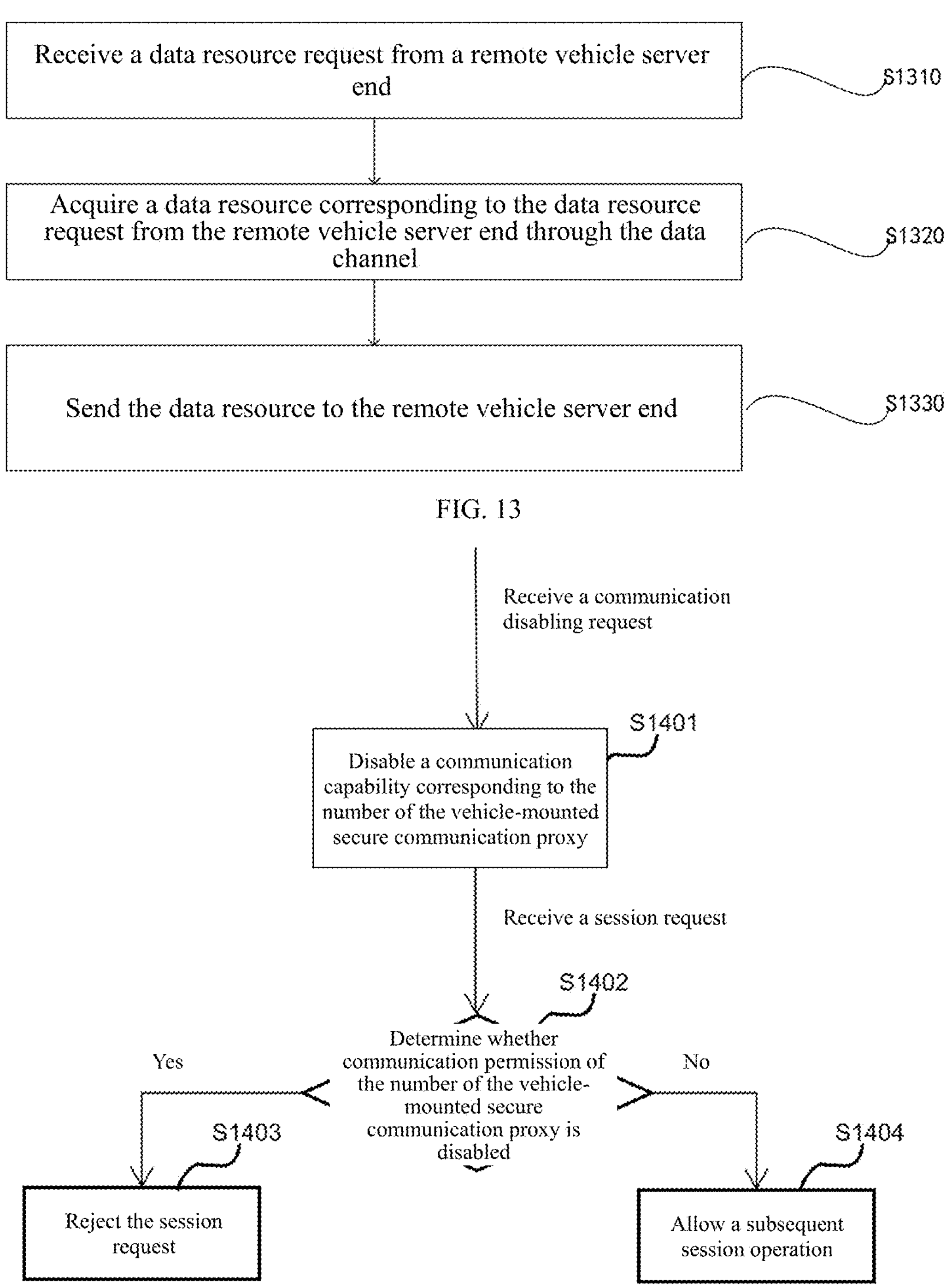
FIG. 13 is a flowchart of steps of a vehicle communication method according to another embodiment of the present disclosure.
FIG. 14 is an example diagram of a vehicle communication method according to another embodiment of the present disclosure.

FIG. 13 is a flowchart of steps of a vehicle communication method according to another embodiment of the present disclosure. Referring to FIG. 13, the method includes, but not limited to, the following steps S1310 to S1330.

At S1310, a data resource request from a remote vehicle server end is received.

At S1320, a data resource corresponding to the data resource request is acquired from the remote vehicle server end through the data channel.

At S1330, the data resource is sent to the remote vehicle server end.

It can be understood that compared with a scenario where the user initiates a request to the outside through the vehicle-mounted secure communication proxy, S1310 to S1330 represent a process of an external entity accessing user data from the vehicle-mounted secure communication proxy through a data channel, for example, a service provided by the vehicle manufacturer or vehicle dealer, including remote diagnosis, remote maintenance, business consultation, etc. The remote vehicle server end establishes communication with the vehicle through the secure communication server end and the vehicle-mounted secure communication proxy, to realize the secure and authorized transmission of vehicle data or vehicle control instructions.

In an embodiment, the method further includes: rejecting to respond to the target service request when the third list includes the first number corresponding to the target service request.

In an embodiment, the method further includes: modifying the third list according to the target service request when a fourth list includes the third number.

It can be understood that the third list corresponds to a blacklist of numbers of vehicle-mounted secure communication proxy ends, and is used for storing first number information of the vehicle-mounted secure communication proxy ends for which authorization is rejected.

It can be understood that the fourth list for storing third number information of a client having permission to modify information in the third list is further set in the secure communication server end, and a highest permission table for storing numbers of some law enforcement agencies is further set in the secure communication server, which is a list preset by the system.

FIG. 14 is a flowchart of a vehicle communication method according to another embodiment of the present disclosure. Referring to FIG. 14, the method includes, but not limited to, the following steps S1401 to S1404.

At S1401, a communication capability corresponding to the number of the vehicle-mounted secure communication proxy is disabled.

Upon receiving service interface disabling information from a law enforcement agency, the secure communication server end disables the communication capability corresponding to the number of the vehicle-mounted secure communication proxy.

At S1402, it is determined whether communication permission of the number of the vehicle-mounted secure communication proxy is disabled, and when receiving a session request from the number of the vehicle-mounted secure communication proxy, the secure communication server end determines whether the number of the vehicle-mounted secure communication proxy has communication permission.

At S1403, when determining that the number of the vehicle-mounted secure communication proxy does not have communication permission, the secure communication server end directly rejects the session request.

At S1404, when determining that the number of the vehicle-mounted secure communication proxy has communication permission, the secure communication server end performs a subsequent session operation.

Through S1401 to S1404, the law enforcement agency can restrict the behavior of the vehicle-mounted secure communication proxy when an anomaly occurs in the vehicle-mounted secure communication proxy. The anomaly includes, but not limited to, that the vehicle-mounted secure communication proxy is controlled by an unauthorized user, or that an authorized user performs illegal behavior through the vehicle-mounted secure communication proxy, e.g., executes abnormal driving behavior through remote control.

FIG. 15 is a flowchart of steps of a vehicle communication method according to another embodiment of the present disclosure. Referring to FIG. 15, the method includes, but not limited to, a following step S1510.

At S1510, when a data channel for communication connection between the vehicle-mounted secure communication proxy end and the secure communication server end has been established, the vehicle-mounted secure communication proxy end communicates with the secure communication server end through the data channel, where the data channel is a channel established by the secure communication server end according to an authorization response, the authorization response is a response generated by a client according to an authorization request and received by the secure communication server end, and the authorization request is a request sent by the secure communication server end to a client corresponding to the vehicle-mounted secure communication proxy end according to a received target service request.

Data channel establishment is separated from data access by the method of the present disclosure, a remote communication end is required to access the secure communication server end to send a request, the secure communication server end establishes a data channel with the vehicle-mounted secure communication proxy end after being authorized by the user, and then the remote communication end indirectly performs remote communication through the secure communication server end, thereby ensuring that all operations performed on the vehicle are supervised by the user.

FIG. 16 is a flowchart of steps of a vehicle communication method according to another embodiment of the present disclosure. Referring to FIG. 16, the method includes, but not limited to, the following steps S1610 to S1630.

At S1610, a data resource request corresponding to the data resource is sent to the secure communication server end through the data channel.

At S1620, the data resource from the secure communication server is received through the data channel.

At S1630, the data resource is deleted after being used.

It can be understood that through S1610 to S1630, the operating efficiency of the vehicle control module can be well improved. Because a program provided by a vehicle service provider is loaded only when it is to be used and will not be loaded when it is not to be used, the operating efficiency of the vehicle control module is effectively improved. In this way, the vehicle-mounted secure communication proxy can acquire a diagnosis or control program from the secure communication server end in response to an operation performed by a user or when receiving a control operation request, and destruct the diagnosis or control program after the diagnosis or control program is used. In this way, problems regarding the update of application programs are solved, and the resources occupied by the program are reduced, thereby improving the usability of the vehicle device.

FIG. 17 is a flowchart of steps of a vehicle communication method according to another embodiment of the present disclosure. Referring to FIG. 17, the method includes, but not limited to, the following steps S1710 to S1720.

At S1710, an authorization request sent by the secure communication server end is received, where the authorization request is sent by the secure communication server end to the client corresponding to the vehicle-mounted secure communication proxy end according to a received target service request.

At S1720, an authorization response is generated according to the authorization request and sent to the secure communication server end, where the authorization response represents that the secure communication server end is authorized to establish a data channel for communication connection between the vehicle-mounted secure communication proxy end and the secure communication server end.

It can be understood that data channel establishment can be separated from data access by the use of the client corresponding to the vehicle owner to authorize the data channel establishment, a remote communication end is required to access the secure communication server end to send an authorization request, the secure communication server end establishes a data channel with the vehicle-mounted secure communication proxy end after authorization is granted by the user, and then the remote communication end indirectly performs remote communication through the secure communication server end, thereby ensuring that all operations performed on the vehicle are supervised by the user.

Figure 18:
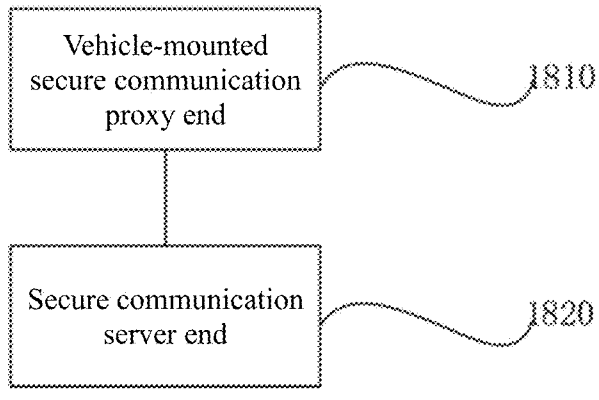
FIG. 18 is a schematic diagram of a remote vehicle communication system according to another embodiment of the present disclosure.

FIG. 18 is a schematic diagram of a remote vehicle communication system according to another embodiment of the present disclosure. Referring to FIG. 18, the remote vehicle communication system includes a vehicle-mounted secure communication proxy end 1810 and a secure communication server end 1820.

The secure communication server end 1820 is configured for sending an authorization request to a client corresponding to the vehicle-mounted secure communication proxy end 1810 according to a received target service request, receiving an authorization response generated by the client according to the authorization request, and establishing a data channel for communication connection between the vehicle-mounted secure communication proxy end 1810 and the secure communication server end 1820 according to the authorization response.

The vehicle-mounted secure communication proxy end 1810 is configured for sending data to the secure communication server end 1820 through the data channel.

For the structure of the remote vehicle communication system, reference may be made to the embodiment corresponding to FIG. 2 and the details will not be repeated here.

Figure 19:
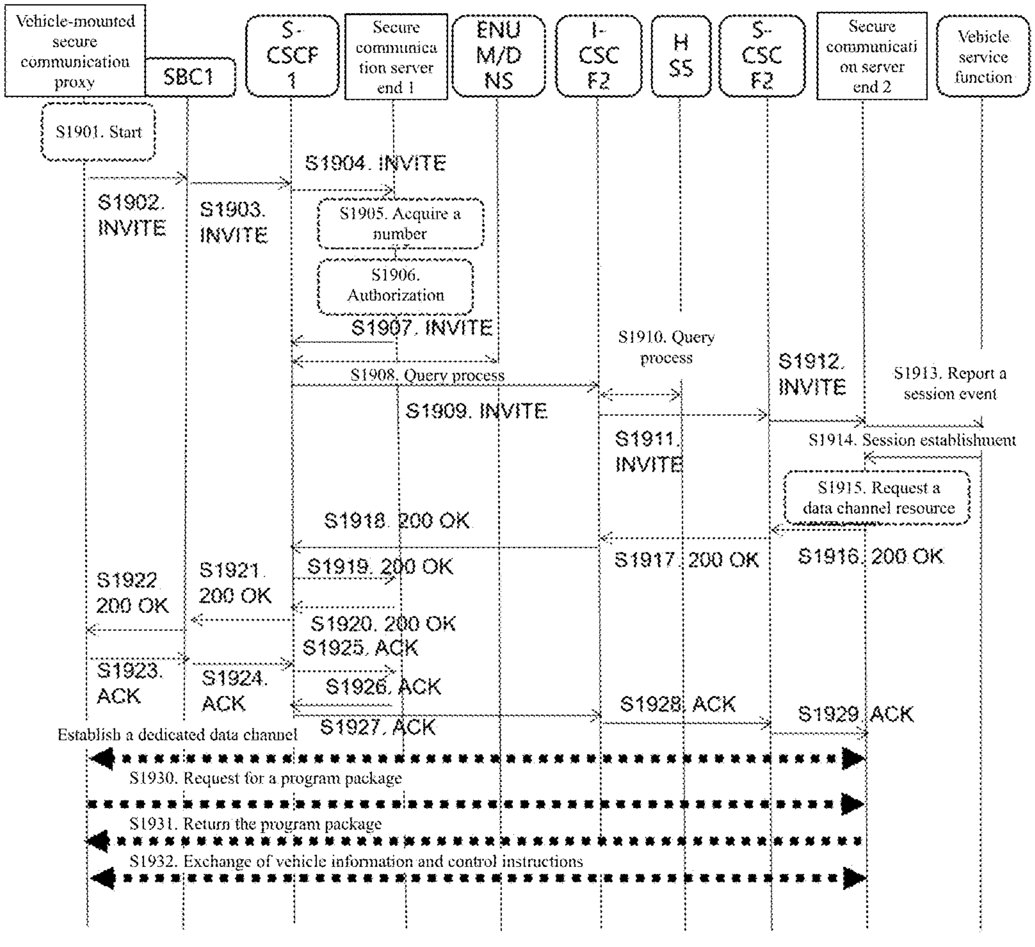
FIG. 19 is an example diagram of a vehicle communication method according to another embodiment of the present disclosure.

FIG. 19 is an example diagram of a vehicle communication method in which a vehicle-mounted secure communication proxy actively initiates a service request to a vehicle service provider according to an embodiment. When a vehicle fails, a user taps on a screen or operates a button to control the vehicle-mounted secure communication proxy to initiate a remote diagnosis and control operation to the vehicle service provider. It can be understood that the reference numerals 1 and 2 of the following functional modules are used for the convenience of description and functional modules 1 and 2 may be the same functional module in actual use. The vehicle communication method includes, but not limited to, the following steps S1901 to S1932.

At S1901, the user selects a remote diagnosis program through the vehicle-mounted secure communication proxy, and starts a remote diagnosis operation.

At S1902, the vehicle-mounted secure communication proxy sends an INVITE request to an SBC1, where the INVITE request carries a number of the vehicle service provider as a called number, and a Session Description Protocol (SDP) in the INVITE request carries media information of a dedicated data channel.

At S1903, the SBC forwards the INVITE request to a corresponding S-CSCF1 according to S-CSCF address information recorded at the time of user registration.

At S1904, the S-CSCF1 checks media row information in SDP in the INVITE request, determines that the current session requires establishment of a dedicated data channel, and forwards the INVITE request to a secure communication server end 1 according to initial Filter Criteria (iFC).

At S1905, the secure communication server end 1 checks authorization information table corresponding to a number of the vehicle-mounted secure communication proxy, extracts a CLIP number from the table, and initiates an authorization request to the CLIP number.

At S1906, the secure communication server end 1 interacts with the CLIP number through a voice call or a message, to prompt the user to determine whether to allow the external communication operation being performed by the vehicle-mounted secure communication proxy. After the user determines to allow the external communication operation, the secure communication server end 1 completes the authorization process for the current session access, and can continue to perform a subsequent process.

At S1907, the secure communication server end replaces the number of the vehicle-mounted secure communication proxy in the INVITE request with the CLIP number, and forwards the request to the S-CSCF1.

At S1908, the S-CSCF1 analyzes a destination number (the number of the vehicle service provider) in the INVITE request, and queries an ENUM/DNS for an I-CSCF2 to which the number of the vehicle service provider belongs.

At S1909, the S-CSCF1 forwards the INVITE request to the I-CSCF2 to which the number of the vehicle service provider belongs.

At S1910, the I-CSCF2 to which the number of the vehicle service provider belongs queries an HSS for information of an S-CSCF2 corresponding to the number of the vehicle service provider.

At S1911, the I-CSCF2 forwards the INVITE request to the S-CSCF2.

At S1912, the S-CSCF2 to which the number of the vehicle service provider belongs checks media row information in SDP in the INVITE request, determines that the current session requires establishment of a dedicated data channel, and forwards the INVITE request to a secure communication server end 2 according to iFC.

At S1913, the secure communication server end 2 checks that the called number is the number of the vehicle service provider, determines that the number is served by itself, acquires related information according to an authorization table of the user, and reports a session event to the vehicle service provider through a service interface. The related information includes media information of the data channel, the CLIP number of the user, the type of the vehicle, etc.

At S1914, a service program of the vehicle service provider determines according to the session information that a remote diagnosis service is remotely requested, and sends an indication of establishing a dedicated data channel to the secure communication server end 2.

At S1915, the secure communication server end 2 requests a dedicated data channel resource.

At S1916, the secure communication server end 2 returns an SIP response 200 OK to the S-CSCF2, where dedicated data channel information of the secure communication server end is carried in an SDP of the response.

At S1917, the response is forwarded to the I-CSCF2 according to an SIP message routing mechanism.

At S1918, the I-CSCF2 forwards the response to the S-CSCF1 according to the SIP message routing mechanism.

At S1919, the S-CSCF1 forwards the response to the secure communication server end 1 according to the SIP message routing mechanism.

At S1920, the secure communication server end 1 forwards the response to the S-CSCF1 according to the SIP message routing mechanism.

At S1921, the S-CSCF1 forwards the response to the SBC1 according to the SIP message routing mechanism.

At S1922, the SBC1 forwards the response to the vehicle-mounted secure communication proxy according to the SIP message routing mechanism.

At S1923-S1929, the vehicle-mounted secure communication proxy sends an Acknowledgment (ACK) request to the secure communication server end 2 according to the SIP message routing mechanism, to complete the establishment of the dedicated data channel.

At S1930, the vehicle-mounted secure communication proxy checks whether the remote diagnostic program already exists locally; if yes, sends a request for acquiring the remote diagnostic program to the secure communication server end 2 through the dedicated data channel, where the request carries version information of the local program; if not, sends a request for acquiring the remote diagnostic program to the secure communication server end through the dedicated data channel, where the request does not carry the version information.

At S1931, the secure communication server end 2 extracts the version information in the request from the dedicated data channel; compares the extracted version information with a version in the server end; determines whether a new version needs to be delivered to the vehicle-mounted secure communication proxy; and if yes, sends a response carrying the new version, or if not, sends a response carrying an indication indicating that no new version needs to be delivered.

At S1932, the vehicle-mounted secure communication proxy loads the remote diagnosis program, and the remote diagnosis program interacts with the vehicle control module, acquires vehicle data from the vehicle control module, and forwards a control instruction to the vehicle control module to perform a vehicle control operation.

Thus, the remote diagnosis program enables the vehicle-mounted secure communication proxy to interact with a remote diagnosis service of the vehicle service provider through the dedicated data channel between the vehicle-mounted secure communication proxy and the secure communication server end.

Figure 20:
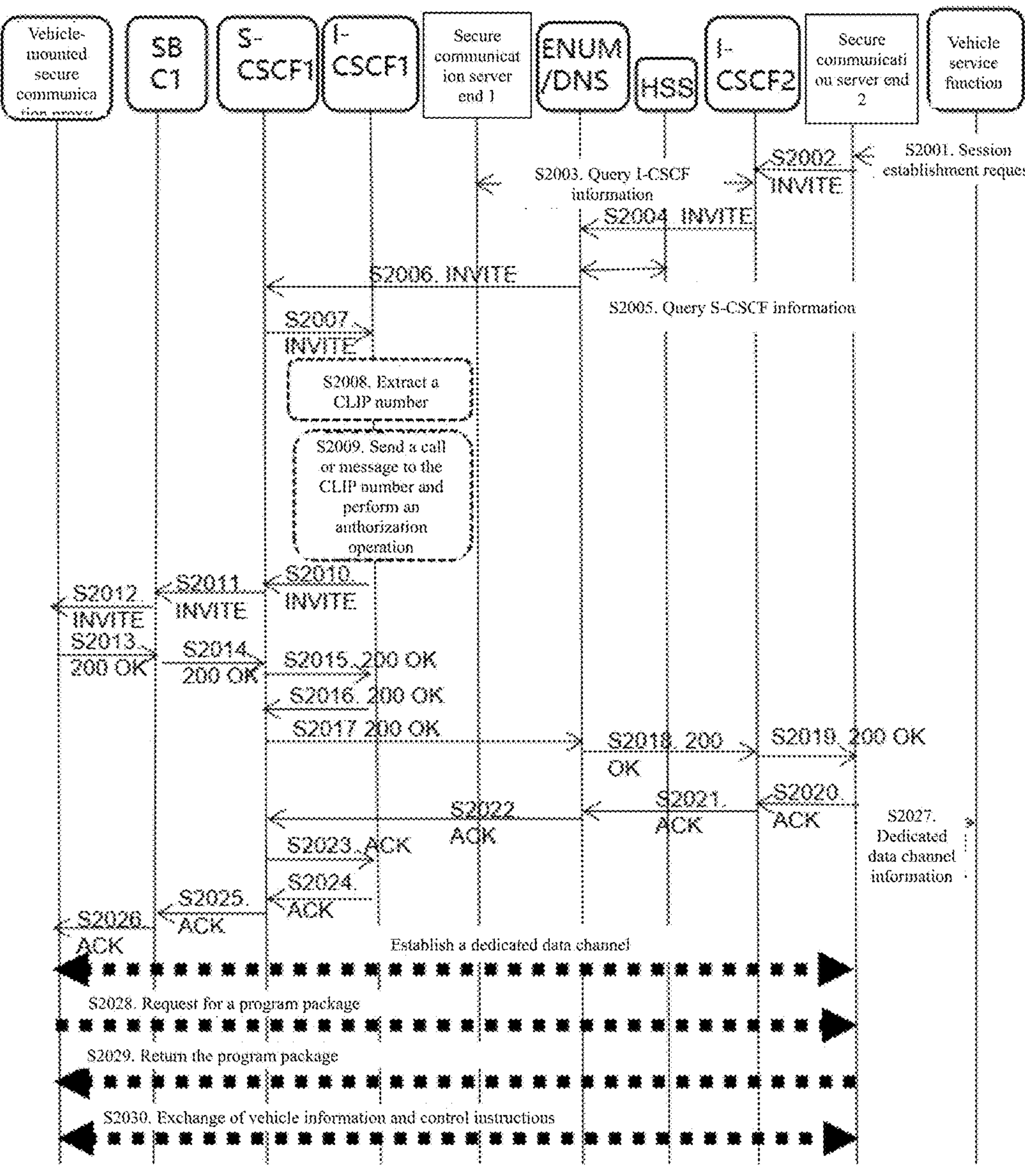
FIG. 20 is an example diagram of a vehicle communication method according to another embodiment of the present disclosure.

FIG. 20 is an example diagram of a vehicle communication method in which a service request is initiated to a vehicle-mounted secure communication proxy according to an embodiment, showing a service interaction process initiated by a vehicle service provider to a CLIP number of a vehicle-mounted secure communication proxy. When the vehicle service provider intends to perform remote vehicle maintenance, the vehicle service provider may actively initiate a service interaction process to the vehicle-mounted secure communication proxy. It can be understood that the reference numerals 1 and 2 of the following functional modules are used for the convenience of description and functional modules 1 and 2 may be the same functional module in actual use. The vehicle communication method includes, but not limited to, the following steps S2001 to S2030.

At S2001, the vehicle service provider calls a service interface and initiates a request to a secure communication server end 2 to establish a dedicated data channel with the vehicle, where the request carries a CLIP number corresponding to a vehicle-mounted secure communication proxy and a corresponding service identifier (for determining a corresponding small program).

At S2002, the secure communication server end 2 sends an INVITE request to an I-CSCF2, where the INVITE request carries a CLIP number of a vehicle-mounted secure communication proxy as a called number, and an SDP in the INVITE request carries media information of a dedicated data channel.

At S2003, the I-CSCF2 analyzes a destination number (the CLIP number of the vehicle-mounted secure communication proxy) in the INVITE request, and queries an ENUM/DNS for an I-CSCF1 to which the destination number belongs.

At S2004, the I-CSCF2 forwards the INVITE request to the I-CSCF1 to which the CLIP number of the vehicle-mounted secure communication proxy belongs.

At S2005, the I-CSCF1 queries an HSS for information of an S-CSCF1 corresponding to the CLIP number of the vehicle-mounted secure communication proxy.

At S2006, the I-CSCF1 forwards the INVITE request to the S-CSCF1.

At S2007, the S-CSCF1 checks media row information in SDP in the INVITE request, determines that the current session requires establishment of a dedicated data channel, and forwards the INVITE request to a secure communication server end 1 according to iFC.

At S2008, the secure communication server end 1 checks that the called number is the CLIP number of the vehicle-mounted secure communication proxy and that the number has subscribed to an authorization service, extracts session information including a calling number, a service request type, etc., from the request, and prepares to execute an authorization operation.

At S2009, the secure communication server end 1 interacts with the CLIP number through a voice call or a message, to prompt the user to determine whether to allow a remote maintenance service being provided by a program of the vehicle service provider. After the user determines to allow the external communication operation, the secure communication server end 1 completes the authorization process for the current session access, and can continue to perform a subsequent process.

At S2010, the secure communication server end 1 acquires a number of a vehicle-mounted secure communication proxy corresponding to the vehicle owned by the user according to an authorization table of the user, and forwards the INVITE request to the S-CSCF1, where a request row (request-URI) of INVITE carries the number of the vehicle-mounted secure communication proxy.

At S2011, the S-CSCF1 forwards the INVITE request to an SBC1 according to registration information of the number of the vehicle-mounted secure communication proxy.

At S2012, the SBC1 forwards the INVITE request to the vehicle-mounted secure communication proxy according to the registration information of the number of the vehicle-mounted secure communication proxy.

At S2013, the vehicle-mounted secure communication proxy returns an SIP response 200 OK to the SBC1, where dedicated data channel information of the secure communication server end 2 is carried in an SDP of the response.

At S2014, the SBC1 forwards the 200 OK response to the S-CSCF1 according to an SIP message routing mechanism.

At S2015, the S-CSCF1 forwards the 200 OK response to the secure communication server end 1 according to the SIP message routing mechanism.

At S2016, the secure communication server end 1 forwards the 200 OK response to the S-CSCF1 according to the SIP message routing mechanism.

At S2017, the S-CSCF1 forwards the 200 OK response to the I-CSCF1 according to an SIP message routing mechanism.

At S2018, the I-CSCF1 forwards the 200 OK response to the I-CSCF2 according to an SIP message routing mechanism.

At S2019, the I-CSCF2 forwards the 200 OK response to the secure communication server end 2 according to the SIP message routing mechanism.

At S2020-S2026, the vehicle-mounted secure communication proxy sends an ACK request to the secure communication server end 2 according to the SIP message routing mechanism, to complete the establishment of the dedicated data channel.

At S2027, the secure communication server end 2 reports key information of the vehicle-mounted secure communication proxy, e.g., the dedicated data channel information, through an interface, to complete the establishment of the dedicated data channel.

At S2028, the vehicle-mounted secure communication proxy checks whether the remote maintenance small program already exists locally; if yes, sends a request for acquiring the remote maintenance small program to the secure communication server end 2 through the dedicated data channel, where the request carries version information of the local small program; if not, sends a request for acquiring the remote diagnostic small program to the secure communication server end 2 through the dedicated data channel, where the request does not carry the version information.

At S2029, the secure communication server end 2 extracts the version information in the request from the dedicated data channel; compares the extracted version information with a version in the server end; determines whether a new version needs to be delivered to the vehicle-mounted secure communication proxy; and if yes, sends a response carrying the new version, or if not, sends a response carrying an indication indicating that no new version needs to be delivered.

At S2030, the vehicle-mounted secure communication proxy loads the remote maintenance small program.

Thus, the remote diagnosis small program can interact with a remote diagnosis service of the vehicle service provider the vehicle-mounted secure communication proxy through the dedicated data channel between the vehicle-mounted secure communication proxy and the secure communication server end 2.

Figure 21:
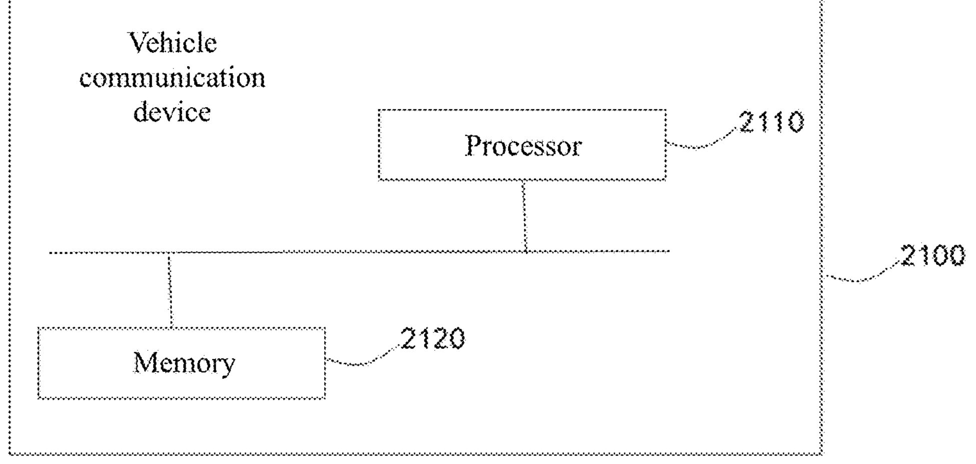
FIG. 21 is a schematic diagram of a vehicle communication device according to another embodiment of the present disclosure.

Referring to FIG. 21, an embodiment of the present disclosure provides a vehicle communication device 2100, including: a memory 2120, a processor 2110, and a computer program stored in the memory and executable by the processor. The computer program, when executed by the processor 2110, causes the processor 2110 to implement the vehicle communication method in any one of the above embodiments, for example, implement the method steps S310 to S340 in FIG. 3, the method steps S410 to S430 in FIG. 4, the method steps S510 to S530 in FIG. 5, the method step S610 in FIG. 6, the method step S710 in FIG. 7, the method step S810 in FIG. 8, the method step S910 in FIG. 9, the method steps S1001 to S1007 in FIG. 10, the method step S1110 in FIG. 11, the method steps S1210 to S1230 in FIG. 12, the method steps S1310 to S1330 in FIG. 13, the method steps S1401 to S1404 in FIG. 14, the method step S1510 in FIG. 15, the method steps S1610 to S1630 in FIG. 16, the method steps S1710 to S1720 in FIG. 17, the method steps S1901 to S1932 in FIG. 19, or the method steps S2001 to S2030 in FIG. 20.

In addition, an embodiment of the present disclosure provides a computer-readable storage medium, storing a computer-executable instruction which, when executed by one or more control processors, causes the one or more control processors to, for example, implement the method steps S310 to S340 in FIG. 3, the method steps S410 to S430 in FIG. 4, the method steps S510 to S530 in FIG. 5, the method step S610 in FIG. 6, the method step S710 in FIG. 7, the method step S810 in FIG. 8, the method step S910 in FIG. 9, the method steps S1001 to S1007 in FIG. 10, the method step S1110 in FIG. 11, the method steps S1210 to S1230 in FIG. 12, the method steps S1310 to S1330 in FIG. 13, the method steps S1401 to S1404 in FIG. 14, the method step S1510 in FIG. 15, the method steps S1610 to S1630 in FIG. 16, the method steps S1710 to S1720 in FIG. 17, the method steps S1901 to S1932 in FIG. 19, or the method steps S2001 to S2030 in FIG. 20.

Through the vehicle communication method proposed in the present disclosure, on the basis of the original vehicle system, a vehicle-mounted secure communication proxy end and a secure communication server end are additionally provided, and a data channel authorized by a user between the vehicle-mounted secure communication proxy end and the secure communication server end is established to realize remote communication. The vehicle-mounted secure communication proxy end is connected to a vehicle device, and the secure communication server end provides an external access interface, to realize the separation of the establishment of a dedicated data channel and the transmission of data content. The transmission of data content needs to be confirmed by a user, and a remote server of a vehicle manufacturer or an APP in a mobile phone can remotely communicate with the vehicle only through an external interface of the secure communication server end. This can prevent an unauthorized remote server of a vehicle manufacturer or an unauthorized APP in a mobile phone from directly communicating with the vehicle remotely, thereby lowering the security risk of user data leakage or malicious remote control of the vehicle.

Those having ordinary skills in the art can understand that all or some of the steps in the methods disclosed above and the functional modules/units in the system and the apparatus may be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present disclosure have been described above, the present disclosure is not limited to the implementations described above. Those having ordinary skills in the art can make various equivalent modifications or replacements without departing from the protection scope of the present disclosure. Such equivalent modifications or replacements fall within the scope defined by the claims of the present disclosure.

What is claimed is:

1. A vehicle communication method, applied to a secure communication server end in communication connection with a vehicle-mounted secure communication proxy end, the method comprising:

receiving a target service request;

determining the vehicle-mounted secure communication proxy end according to the target service request;

determining the client corresponding to the vehicle-mounted secure communication proxy end according to the vehicle-mounted secure communication proxy end;

determining a first number from a preset first list according to the vehicle-mounted secure communication proxy end, wherein the first number is a unique identification number of the vehicle-mounted secure communication proxy end;

determining a second number according to the first number, wherein the second number is a calling line identification presentation (CLIP) number of the vehicle-mounted secure communication proxy end;

determining the client corresponding to the vehicle-mounted secure communication proxy end according to the second number;

sending authorization information generated according to the target service request to the client;

receiving an authorization response generated by the client according to the authorization request; and establishing, according to the authorization response, a data channel for communication connection between the vehicle-mounted secure communication proxy end and the secure communication server end;

wherein the target service request comprises a service request sent to the vehicle-mounted secure communication proxy end and a service request sent by the vehicle-mounted secure communication proxy end.

2. The method of claim 1, wherein the secure communication server end is in communication connection with the vehicle-mounted secure communication proxy end through an Internet Protocol Multimedia Subsystem (IMS) system, the target service request is a service request sent by the vehicle-mounted secure communication proxy end, and establishing, according to the authorization response, a data channel for communication connection between the vehicle-mounted secure communication proxy end and the secure communication server end comprises:

sending the target service request to the IMS system according to the authorization response, such that the IMS system determines a target secure communication server end according to the target service request; and establishing the data channel for communication connection between the vehicle-mounted secure communication proxy end and the target secure communication server end through the IMS system.

3. The method of claim 2, wherein after establishing, according to the authorization response, a data channel for communication connection between the vehicle-mounted secure communication proxy end and the secure communication server end, the method comprises:

receiving a data resource request from the vehicle-mounted secure communication proxy end through the data channel;

acquiring a data resource corresponding to the data resource request from a remote vehicle server end; and sending the data resource to the vehicle-mounted secure communication proxy end through the data channel.

4. The method of claim 1, wherein the secure communication server end is in communication connection with the vehicle-mounted secure communication proxy end through an IMS system, the target service request has a destination node which is the vehicle-mounted secure communication proxy end, and, establishing, according to the authorization response, a data channel for communication connection between the vehicle-mounted secure communication proxy end and the secure communication server end comprises:

sending the target service request to the IMS system according to the authorization response, such that the IMS system determines a source secure communication server end according to the target service request and determines the source secure communication server end as a target secure communication server end; and establishing the data channel for communication connection between the vehicle-mounted secure communication proxy end and the target secure communication server end through the IMS system, wherein the source secure communication server end is the first secure communication server end that receives the target service request.

5. The method of claim 4, wherein after establishing, according to the authorization response, a data channel for communication connection between the vehicle-mounted secure communication proxy end and the secure communication server end, the method comprises:

receiving a data resource request from a remote vehicle server end;

acquiring a data resource corresponding to the data resource request from the remote vehicle server end through the data channel; and sending the data resource to the remote vehicle server end.

6. The method of claim 1, wherein a second list is set in the secure communication server end, the second list comprises authorized number information, and after receiving a target service request, the method further comprises:

establishing, according to the target service request, the data channel for communication connection between the vehicle-mounted secure communication proxy end and the secure communication server end in response to the second list comprising a third number, wherein the third number is a calling number of the target service request; or in response to the second list not comprising the third number, sending the authorization request information carrying the third number to the client corresponding to the second number, receiving the authorization response generated by the client according to the authorization request, and establishing, according to the authorization response, the data channel for communication connection between the vehicle-mounted secure communication proxy end and the secure communication server end.

7. The method of claim 1, wherein in response to the secure communication server end being a response end and the vehicle-mounted secure communication proxy end being an originating end, the method comprises, after receiving an authorization response generated by the client according to the authorization request, changing the first number in the target service request to the second number.

8. The method of claim 1, wherein a third list for storing first number information of the vehicle-mounted secure communication proxy end for which authorization is rejected is further set in the secure communication server end, and after receiving the target service request sent to or sent by the vehicle-mounted secure communication proxy end, the method comprises:

rejecting to respond to the target service request in response to the third list comprising the first number corresponding to the target service request.

9. The method of claim 8, wherein a fourth list for storing third number information of a client having permission to modify information in the third list is further set in the secure communication server end, and after establishing, according to the authorization response, a data channel for communication connection between the vehicle-mounted secure communication proxy end and the secure communication server end, the method comprises:

modifying the third list according to the target service request in response to the fourth list comprising the third number.

10. The method of claim 9, wherein the fourth list is configured for storing numbers of law enforcement agencies, the method further comprises:

in response to receiving service interface disabling information from a law enforcement agency, disabling a communication capability corresponding to the number of the vehicle-mounted secure communication proxy;

in response to receiving a session request from the number of the vehicle-mounted secure communication proxy, determining whether the number of the vehicle-mounted secure communication proxy has communication permission in response to determining that the number of the vehicle-mounted secure communication proxy does not have communication permission, rejecting the session request;

in response to determining that the number of the vehicle-mounted secure communication proxy has communication permission, performing a subsequent session operation.

11. The method of claim 1, wherein in response to the client corresponding to a plurality of vehicle-mounted secure communication proxy ends, after receiving a target service request, the method further comprises:

sending an authorization request to the corresponding client according to the target service request;

receiving an authorization response generated by the client according to the authorization request, wherein the authorization response carries a target vehicle-mounted secure communication proxy end determined by the client from the plurality of vehicle-mounted secure communication proxy ends; and establishing, according to the target vehicle-mounted secure communication proxy end, a data channel for communication connection between the target vehicle-mounted secure communication proxy end and the secure communication server end.

12. The method of claim 1, the first list comprises correspondences between an identifier (globally unique) of the vehicle-mounted secure communication proxy, authorized number, vehicle brand (identifier), and the CLIP number.

13. A vehicle communication device, comprising a memory, a processor, and a computer program stored in the memory and executable by the processor, wherein the computer program, when executed by the processor, causes the processor to perform a vehicle communication method comprising:

receiving a target service request;

determining the vehicle-mounted secure communication proxy end according to the target service request;

determining the client corresponding to the vehicle-mounted secure communication proxy end according to the vehicle-mounted secure communication proxy end;

determining a first number from a preset first list according to the vehicle-mounted secure communication proxy end, wherein the first number is a unique identification number of the vehicle-mounted secure communication proxy end;

determining a second number according to the first number, wherein the second number is a calling line identification presentation (CLIP) number of the vehicle-mounted secure communication proxy end;

determining the client corresponding to the vehicle-mounted secure communication proxy end according to the second number;

sending authorization information generated according to the target service request to the client;

receiving an authorization response generated by the client according to the authorization request; and establishing, according to the authorization response, a data channel for communication connection between the vehicle-mounted secure communication proxy end and the secure communication server end;

wherein the target service request comprises a service request sent to the vehicle-mounted secure communication proxy end and a service request sent by the vehicle-mounted secure communication proxy end.

14. The vehicle communication device of claim 13, wherein the secure communication server end is in communication connection with the vehicle-mounted secure communication proxy end through an Internet Protocol Multimedia Subsystem (IMS) system, the target service request is a service request sent by the vehicle-mounted secure communication proxy end, and establishing, according to the authorization response, a data channel for communication connection between the vehicle-mounted secure communication proxy end and the secure communication server end comprises:

sending the target service request to the IMS system according to the authorization response, such that the IMS system determines a target secure communication server end according to the target service request; and establishing the data channel for communication connection between the vehicle-mounted secure communication proxy end and the target secure communication server end through the IMS system.

15. The vehicle communication device of claim 13, wherein the secure communication server end is in communication connection with the vehicle-mounted secure communication proxy end through an IMS system, the target service request has a destination node which is the vehicle-mounted secure communication proxy end, and, establishing, according to the authorization response, a data channel for communication connection between the vehicle-mounted secure communication proxy end and the secure communication server end comprises:

sending the target service request to the IMS system according to the authorization response, such that the IMS system determines a source secure communication server end according to the target service request and determines the source secure communication server end as a target secure communication server end; and establishing the data channel for communication connection between the vehicle-mounted secure communication proxy end and the target secure communication server end through the IMS system, wherein the source secure communication server end is the first secure communication server end that receives the target service request.

16. The vehicle communication device of claim 13, wherein a second list is set in the secure communication server end, the second list comprises authorized number information, and after receiving a target service request, the method further comprises:

establishing, according to the target service request, the data channel for communication connection between the vehicle-mounted secure communication proxy end and the secure communication server end in response to the second list comprising a third number, wherein the third number is a calling number of the target service request; or in response to the second list not comprising the third number, sending the authorization request information carrying the third number to the client corresponding to the second number, receiving the authorization response generated by the client according to the authorization request, and establishing, according to the authorization response, the data channel for communication connection between the vehicle-mounted secure communication proxy end and the secure communication server end.

17. A non-transitory computer-readable storage medium, storing a computer-executable instruction which, when executed by a processor, causes the processor to perform a vehicle communication method comprising:

receiving a target service request;

determining the vehicle-mounted secure communication proxy end according to the target service request;

determining the client corresponding to the vehicle-mounted secure communication proxy end according to the vehicle-mounted secure communication proxy end;

determining a first number from a preset first list according to the vehicle-mounted secure communication proxy end, wherein the first number is a unique identification number of the vehicle-mounted secure communication proxy end;

determining a second number according to the first number, wherein the second number is a calling line identification presentation (CLIP) number of the vehicle-mounted secure communication proxy end;

determining the client corresponding to the vehicle-mounted secure communication proxy end according to the second number;

sending authorization information generated according to the target service request to the client;

receiving an authorization response generated by the client according to the authorization request; and establishing, according to the authorization response, a data channel for communication connection between the vehicle-mounted secure communication proxy end and the secure communication server end;

wherein the target service request comprises a service request sent to the vehicle-mounted secure communication proxy end and a service request sent by the vehicle-mounted secure communication proxy end.

18. The non-transitory computer-readable storage medium of claim 17, wherein the secure communication server end is in communication connection with the vehicle-mounted secure communication proxy end through an Internet Protocol Multimedia Subsystem (IMS) system, the target service request is a service request sent by the vehicle-mounted secure communication proxy end, and establishing, according to the authorization response, a data channel for communication connection between the vehicle-mounted secure communication proxy end and the secure communication server end comprises:

sending the target service request to the IMS system according to the authorization response, such that the IMS system determines a target secure communication server end according to the target service request; and establishing the data channel for communication connection between the vehicle-mounted secure communication proxy end and the target secure communication server end through the IMS system.

19. The non-transitory computer-readable storage medium of claim 17, wherein the secure communication server end is in communication connection with the vehicle-mounted secure communication proxy end through an IMS system, the target service request has a destination node which is the vehicle-mounted secure communication proxy end, and, establishing, according to the authorization response, a data channel for communication connection between the vehicle-mounted secure communication proxy end and the secure communication server end comprises:

sending the target service request to the IMS system according to the authorization response, such that the IMS system determines a source secure communication server end according to the target service request and determines the source secure communication server end as a target secure communication server end; and establishing the data channel for communication connection between the vehicle-mounted secure communication proxy end and the target secure communication server end through the IMS system, wherein the source secure communication server end is the first secure communication server end that receives the target service request.

20. The non-transitory computer-readable storage medium of claim 17, wherein a second list is set in the secure communication server end, the second list comprises authorized number information, and after receiving a target service request, the method further comprises:

establishing, according to the target service request, the data channel for communication connection between the vehicle-mounted secure communication proxy end and the secure communication server end in response to the second list comprising a third number, wherein the third number is a calling number of the target service request; or in response to the second list not comprising the third number, sending the authorization request information carrying the third number to the client corresponding to the second number, receiving the authorization response generated by the client according to the authorization request, and establishing, according to the authorization response, the data channel for communication connection between the vehicle-mounted secure communication proxy end and the secure communication server end.

* * * * *